United States Patent [19]

Ariga et al.

[11] 3,980,064
[45] Sept. 14, 1976

[54] INTERNAL COMBUSTION ENGINE

[75] Inventors: Hajime Ariga, Yokohama; Shuzo Maruyama, Kamakura, both of Japan

[73] Assignee: Nissan Motor Co., Ltd., Japan

[22] Filed: Feb. 22, 1973

[21] Appl. No.: 334,658

[30]  Foreign Application Priority Data
  Apr. 21, 1972  Japan................................ 47-40179
  June 28, 1972  Japan................................ 47-64686
  July 4, 1972  Japan................................ 47-67408
  Apr. 3, 1972  Japan................................ 47-33328
  Sept. 13, 1972  Japan................................ 47-92124

[52] U.S. Cl. ......................... 123/119 A; 123/119 E
[51] Int. Cl.² ......................................... F02M 25/00
[58] Field of Search ............ 123/119 E, 119 A, 1 A, 123/119 R, DIG. 12, 32 JV, 32 V, 25 L, 25 A, 25 E; 137/604, 605, 111, 101.11, 87, 512, 512.3, 513, 512.5; 239/413, 533; 261/18 A

[56]  References Cited
  UNITED STATES PATENTS

| | | | |
|---|---|---|---|
| 2,682,883 | 7/1954 | Phillips ............................... | 137/111 |
| 2,744,469 | 5/1956 | Schaeffer ........................... | 137/513 |
| 2,862,482 | 12/1958 | Hart ................................ | 123/119 E |
| 2,884,912 | 5/1959 | Lewis ............................... | 123/119 A |
| 3,298,176 | 1/1967 | Forsyth ........................... | 123/119 A |
| 3,608,529 | 9/1971 | Smith ................................ | 123/1 A |
| 3,696,795 | 10/1972 | Smith .......................... | 123/DIG. 12 |
| 3,807,373 | 4/1974 | Chen ............................... | 123/119 A |

FOREIGN PATENTS OR APPLICATIONS
449,725  10/1912  France ................................ 239/533

Primary Examiner—Charles J. Myhre
Assistant Examiner—R. H. Lazarus
Attorney, Agent, or Firm—Robert E. Burns; Emmanuel J. Lobato; Bruce L. Adams

[57]  ABSTRACT

Herein disclosed is a new internal combustion engine which is operable on a fuel which is combusted with the agency of an oxidizing gas containing hydrogen peroxide or oxygen gas so that exhaust gases emitted from the engine contains no nitrogen oxides in the absence of the element nitrogen in the oxidizing gas. Where the hydrogen peroxide in particular is utilized, the hydrogen peroxide exothermically decomposes into a hot mixture of water and oxygen so that the fuel is combusted at a high temperature so that the exhaust gases are clear of not only the nitrogen oxides but unburned hydrocarbons and carbon monoxide. Since no air is used as the oxidizing gas for the fuel, the internal combustion engine is suitable for use in operations in those environments in which air is extremely thin although the engine can be successfully incorporated in various power driven vehicles.

5 Claims, 16 Drawing Figures

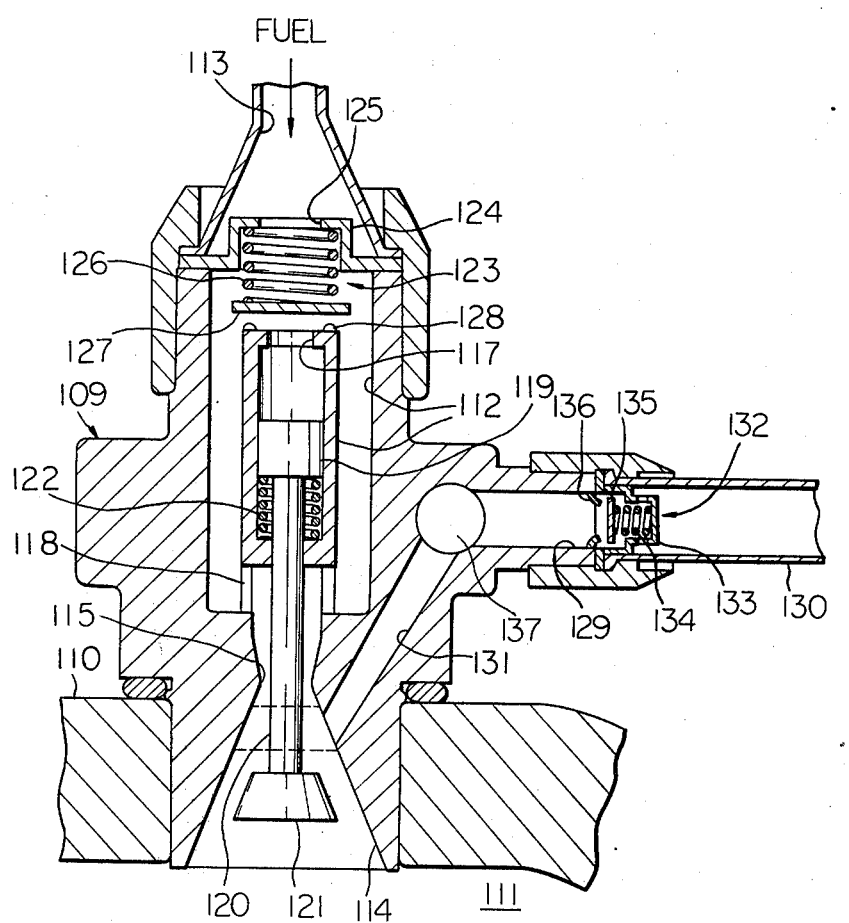

INTERNAL COMBUSTION ENGINE

The present invention relates generally to internal combustion engines and more particularly to the internal combustion engines of the character in which emission of unburned hydrocarbons and harmful chemicals is eliminated or at least reduced to a minimum.

Exhaust gases from the prior art internal combustion engines contain unburned or partly burned hydrocarbons and other harmful chemicals such as carbon monoxide and nitrogen oxides which are the major causes of the air contamination in urban areas of late. A variety of devices have thus far been proposed and put into practice to reduce the toxic compounds in the exhaust gases especially from the automotive internal combustion engines or the engines for industrial processes. For the reduction of the carbon monoxide and unburned hydrocarbons in the exhaust gases, for instance, various means have been developed in an effort to achieve complete combustion of the gasoline or hydrocarbons in the engine combustion chambers or to re-oxidize or "afterburn" the combustible mixtures in the exhaust gases passing through exhaust systems of the engines. The complete combustion of the fuels in the engines or the re-oxidization of the exhaust gases containing the unburned combustible mixtures result in production of the nitrogen oxides and, thus, various attempts have been made to provide a useful compromise between the mutually conflicting requirements for reducing the carbon monoxide and unburned hydrocarbons and reducing the nitrogen oxides in the exhaust gases from the internal combustion engines.

It is, however, apparent that these requirements can not be completely met with in the prior art internal combustion engines operating on the mixture of fuel and air which is responsible for the formation of the nitrogen oxides.

The present invention contemplates provision of a new and useful internal combustion engine in which the fuel is combusted with the agency of an oxidizing gas not containing element nitrogen so that the exhaust gases emitted from the engine are clear of the toxic nitrogen oxides. In the absence of the nitrogen in the oxidizing gas for the fuel, the fuel can be combusted at any increased efficiency and temperature so that the exhaust gases from the engine are free from not only the nitrogen oxides but the carbon monoxide and unburned hydrocarbons which would otherwise result from the incomplete combustion of the fuel.

The oxidizing gas may be a gas containing hydrogen peroxide ($H_2O_2$) or a gas of oxygen ($O_2$), although the former is preferred to the latter by reason of the safety and ease of storage and handling during use of the engine. The fuel, on the other hand, may be hydrocarbons ($C_nH_m$) of a solid, liquid or gaseous phase, or a gas of hydrogen ($H_2$). Where the hydrogen peroxide is used as the oxidizing agent for the fuel, preferably by the aid of a catalyst which may be based on silver, the hydrogen peroxide is exothermically decomposed into water vapour and oxygen as follows:

$$H_2O_2 \rightarrow H_2O + \tfrac{1}{2}O_2.$$

The exothermic decomposition of the hydrogen peroxide is accompanied by generation of heat of a temperature reaching, say, about 700°C and the, mixture of the water vapour and oxygen contains nascent oxygen in a great proportion so that the gases thus produced have an extremely high chemical activity. If, therefore, the hot mixed gases of the water vapour and oxygen are brought into contact with the fuel in the form of hydrocarbons or hydrogen gas, the following reaction will take place immediately without aid of any external agency:

$$H_2O + \tfrac{1}{2}O_2 + C_nH_m \rightarrow H_2O + CO_2, \text{ or}$$

$$H_2O + \tfrac{1}{2}O_2 + H_2 \rightarrow H_2O.$$

Where the oxygen gas is used as the oxidizing gas for the fuel such as the hydrocarbons or hydrogen, the following reaction will be brought about:

$$O_2 + C_nH_m \rightarrow H_2O + CO_2, \text{ or}$$

$$O_2 + H_2 \rightarrow H_2O.$$

The temperature of the mixed gases of the water vapour and carbon dioxide ($H_2O + CO_2$) reaches as high as about 2,000°C which is more than enough to achieve the complete combustion of the fuel in the form of hydrocarbons so that the exhaust gases resulting from the combustion are completely clear of carbon monoxide and unburned hydrocarbons.

The heat produced as a result of the combustion of the hydrocarbons or hydrogen gas causes a pressure on the gases confined in a combustion chamber of the engine and works to drive a piston in the engine cylinder. The temperature of the heat, say, of the order of 2,000°C as above mentioned is excessive and the volume of the gases working on the piston deficient for achieving a stabilized combustion condition in the engine. It is, for this reason, preferable that an additional gas or gases be supplied to the combustion chamber so as to add to the quantity of the gases working on the piston and to reduce the engine operating temperature to proper levels depending upon varying driving conditions of the engine. For this purpose, any chemically inert gas or gases such as air, water vapour or the exhaust gases resulting from the combustion of the fuel in the engine may be mixed with the oxidizing gas containing the hydrogen peroxide, the fuel in a liquid or gaseous state or a mixture of the liquid or gaseous fuel and the hydrogen peroxide. Where it is desired to use the exhaust gases as the additional working fluid, the exhaust gases may be recirculated either substantially totally or in part to the combustion chamber. Where, on the other hand, air is used as the additional working fluid, the toxic nitrogen oxides may be contained in the exhaust gases from the engine. Because, however, of the limited concentration of the air in the gases drawn into the combustion chamber and because of the fact that the engine operating temperature is significantly reduced by the air itself, the rate of the nitrogen oxide emission will be limited to practically permissible levels.

The proportions of the fuel, hydrogen peroxide and additional gas may be determined as follows:

In view of the molecular weights of the hydrogen peroxide, water and oxygen in the previously described relation dictating the decomposition of the hydrogen peroxide, two parts of hydrogen peroxide (molecular weight: 34) produce approximately one part of water (molecular weight: 18) and approximately one part of oxygen (molecular weight: 16) on a weight basis, so that:

$$H_2O_2 : H_2O : O_2 = 2 : 1 : 1. \qquad \text{Eq. 1}$$

Assuming that a usual internal combustion engine operates on a combustible mixture having an air-to-fuel ratio of 15 vs. 1, theoretically three parts by weight of oxygen will be required for the complete combustion of one part by weight of fuel while about 12 parts by weight of nitrogen will lend itself to working on the piston. Hence, $$O_2 : N_2 : C_nH_m = 3 : 12 : 1. \qquad \text{Eq. 2}$$

To obtain three parts by weight of oxygen for the combustion of one part by weight of fuel in the internal combustion engine according to the present invention, approximately six parts by weight of hydrogen peroxide should be decomposed into the water and hydrogen as will be apparent from Eq. 1. This will result in production of three parts by weight of water. If, thus, the fuel having the same composition as that of the fuel in the prior art internal combustion engine is to be used so that approximately 12 parts by weight of working fluid should be supplied to the engine combustion chamber for one part by weight of fuel, nine parts by weight of additional working fluid should be added to the three parts by weight of water resulting from the decomposition of the hydrogen peroxide. The conclusion will therefore be that theoretically about nine parts by weight of additional working fluid should be drawn into the combustion chamber for one part by weight of fuel in the internal combustion engine according to the present invention. Where, however, the water vapour or the exhaust gases such as the mixture of the water vapour and carbon dioxide are used as the additional working fluid as previously mentioned, approximately six to seven parts by weight of such fluid may be appropriate for one part of fuel because the water or the mixture of water and carbon dioxide is a polyatomic substance.

To realize above mentioned features, the internal combustion engine according to the present invention comprises, in a most simplified form, a combustion chamber, means for supplying a fuel to the combustion chamber, and means for supplying an oxidizing gas containing hydrogen peroxide to the combustion chamber during intake strokes, the hydrogen peroxide being exothermically decomposed for generating heat to combust the fuel in the combustion chamber. In a more specific form, the internal combustion chamber may further comprise means for supplying an additional gas to the combustion chamber during intake strokes for reducing the temperature of the gases in the combustion chamber and adding to the quantity of the gases to work on a piston of the engine. Where it is desired that the exhaust gases from the combustion chamber be utilized as the additional gas, the additional gas supply means may comprise an exhaust recirculation passageway providing communication between intake and exhaust ports of the combustion chamber so that the exhaust gases emitted from the exhaust port are at least partly recirculated into the combustion chamber through the intake port. If the exhaust gases are partly yet continuously recirculated to the combustion chamber, the internal combustion engine may further comprise means for partly discharging the exhaust gases outwardly of the engine. The additional gas supply means may comprise, in another preferred form, air intake means for directing atmospheric air into the combustion chamber during intake strokes or water injection means for injecting water into the combustion chamber for producing water vapour in the combustion chamber during intake strokes by the heat of the gases in the chamber. Where the additional gas supply means is thus adapted to supply air or water to the combustion chamber, the internal combustion engine according to the present invention may be further provided with exhaust discharge means for substantially totally discharging the exhaust gases from the combustion chamber outwardly of the engine.

For the purpose of accelerating the exothermic decomposition of the hydrogen peroxide used as the oxidizing gas for the fuel, the internal combustion engine having the construction above described may be provided with at least one catalyst of, for instance, a silver-based material, which catalyst is positioned in a passage of the hydrogen peroxide gas anterior to an outlet of the passage to the combustion chamber so that the hydrogen peroxide is permitted to exothermically decompose at an increased rate before entering the combustion chamber.

The gist of the present invention is applicable to any types of internal combustion engines such as the two-cycle and four-cycle internal combustion engine or the reciprocating-piston or rotary-piston internal combustion engines and diesel or compressionignition engines. Moreover, any types of fuel may be operable in the internal combustion engine according to the present invention, including a liquid fuel such as gasoline or kerosene, a gaseous fuel such as a liquefied petroleum gas or a hydrogen gas, or a solid fuel such as waste plastics.

Where the liquid or gaseous fuel is used, the oxidizing gas such as the hydrogen peroxide or oxygen gas may be mixed with either the fuel or a mixture of the fuel and the additional gas before being admitted to the combustion chamber. If the oxidizing gas is to be mixed with the fuel in a liquid or gaseous state, the means to supply the fuel and oxidizing gas may have passages which terminate in an injection nozzle opened into the combustion chamber while the means to supply the additional gas may be opened into the combustion chamber through an intake port formed in the combustion chamber whereby the mixture of the fuel and oxidizing gas produced in the injection nozzle is further mixed with the additional gas admitted to the combustion chamber throgh the intake port. If, on the other hand, the oxidizing gas is to be mixed with the mixture of the fuel and additional gas, then the additional gas supply means may have a passage which opens into the combustion chamber through an intake port formed in the chamber and the fuel supply means may have a passage which opens into the additional gas supply passage anterior to the intake port in the combustion chamber. In this instance, the oxidizing gas supply means may be opened into the combustion chamber through a valved injection nozzle so that the mixture of the fuel and additional gas produced in the additional gas supply passage is further mixed with the oxidizing gas admitted to the combustion chamber through the injection nozzle.

Where the solid fuel such as the waste plastics is to be utilized in the internal combustion engine according to the present invention as previously noted, then the oxidizing gas supply means may have a passage which opens into the combustion chamber through an injection nozzle forming part of the oxidizing gas supply means while the additional gas supply means may have a passage which opens into the combustion chamber through an intake port formed in the chamber. The solid fuel, which may be stored in the engine in a package form, is preferably positioned in a vis-a-vis relation to the injection nozzle leading from the oxidizing gas supply passage so that the hot mixture of the oxidizing gas and the additional gas produced in the combustion chamber is forcibly contacted with a working surface of the solid fuel. The use of the waste plastics as the solid fuel as above described will contribute to reduction of the contamination problem resulting from the plastics garbage.

Where the internal combustion engine of the character thus far described is to be installed on a motor vehicle, consideration should be taken into the limited capacity of a container for storing the oxidizing gas such as the hydrogen peroxide or oxygen gas and, for this reason, saving of the comsumption of the oxidizing gas becomes one of the major requirements of the engine. To meet this particular requirement in a simple construction, the internal combustion engine according to the present invention may be provided with two substantially independent mixture supply units which are operable selectively depending upon the varying driving conditions of the engine or the motor vehicle. One mixture supply unit is constructed essentially similarly to the corresponding arrangement of the engine previously described and thus includes the means which are adapted to supply the fuel in the form of hydrocarbons or hydrogen gas and the oxidizing gas of the hydrogen peroxide or oxygen and, where preferred, the means to supply the additional gas to be used as the working fluid in the combustion chamber. The other mixture supply unit is essentially similar to that used in the usual internal combustion engine operating on the mixture of a fuel in the form of hydrocarbons and air, thus including a carburetor through which the fuel is atomized and mixed with the air to a predetermined air-to-fuel ratio in a well known manner. The fuels for the two mixture supply units may be different ones but, for simplicity of construction and economy of production of the engine, it is preferred that the mixture supply units receive the same fuel from a common source through separate fuel feed pipelines diverting from the fuel source. One fuel feed pipeline opens into an injection nozzle through which the oxidizing gas is admitted to the combustion chamber together with the fuel from the particular pipeline while the other fuel feed pipeline opens into the carburetor so that the mixture of the fuel and air is delivered into the combustion chamber through an intake port which is formed in the combustion chamber. These pipelines are connected to the fuel source through a three-way valve which is responsive to the varying driving conditions of the engine or motor vehicle and thus serves to shift the delivery of fuel between the two pipelines in accordance with a predetermined driving condition or conditions of the engine or motor vehicle. The carburetor may form part of the additional gas supply passage of the first mixture supply unit so as to provide a further simplified and economical construction of the engine. In this instance, the carburtor communicates upstream with the source of the additional gas and with the open air through a two-position selector valve. The two-position selector valve is also responsive to the driving conditions of the engine or motor vehicle and thus serves to cut of the passage of the air into the carburetor when the engine is to operate on the mixture of the fuel and hydrogen peroxide or oxygen gas and to at least partially cut off the passage of the additional gas into the carburetor when the engine is to operate on the mixture of the fuel and air. Where the exhaust gases from the combustion chamber are utilized as the additional gas, the carburetor may communicate via the two-position selector valve with an exhaust port of the combustion chamber through an exhaust recirculation passageway. This exhaust recirculation passageway is provided with a valve which is adapted to totally or partially open the passageway to the atmosphere when the engine is to operate on the mixture of the fuel and air. If the valve is arranged so as to totally open the exhaust recirculation passageway under such conditions, the exhaust gases from the combustion chamber will be totally discharged to the open air. If, however, the valve is adapted to partially open the passageway to the atmosphere, then the two-position selector valve in the carburetor may be so arranged as to permit restricted flow of the exhaust gases therethrough when the two-position selector valve is in a position providing the communication between the carburetor and the open air. When, thus, the engine is to operate on the mixture of the fuel and air, the exhaust gases from the combustion chamber will be partly discharged to the open air and partly recirculated to the combustion chamber through the carburetor so that the recirculated exhaust gases are re-combusted with the resultant reduction of the concentrations of the unburned hydrocarbons and carbon monoxide.

The features and advantages of the internal combustion engine according to the present invention will become more apparent from the following detailed description of the various preferred embodiments and with reference to the accompanying drawings in which corresponding parts and elements are designated by like reference numerals and in which:

FIG. 7 is a longitudinal sectional view showing a preferred example of a fluid injection valve which is adapted for use particularly in a diesel engine implementing the present invention;

Figure 14:
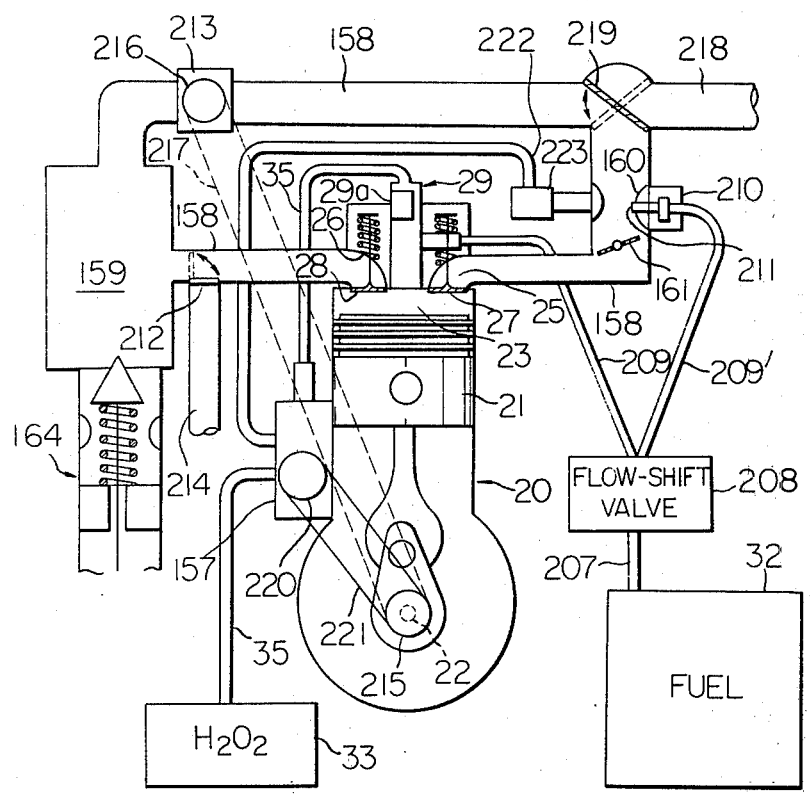
FIG. 14 is a schematic view showing still another reciprocating-piston internal combustion engine embodying the present invention.
Figure 15:
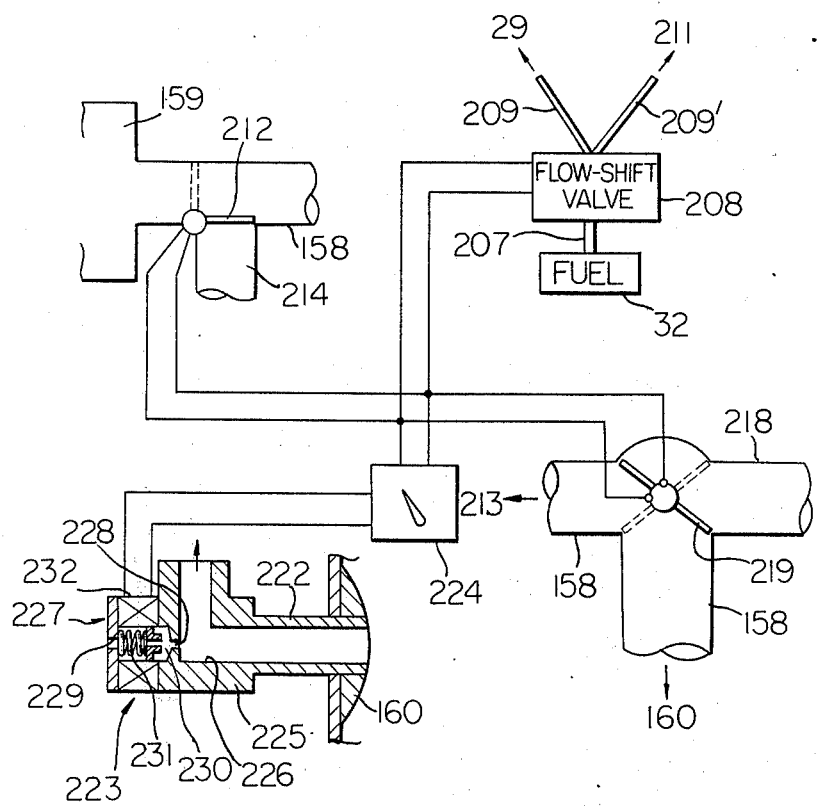
Figure 16:
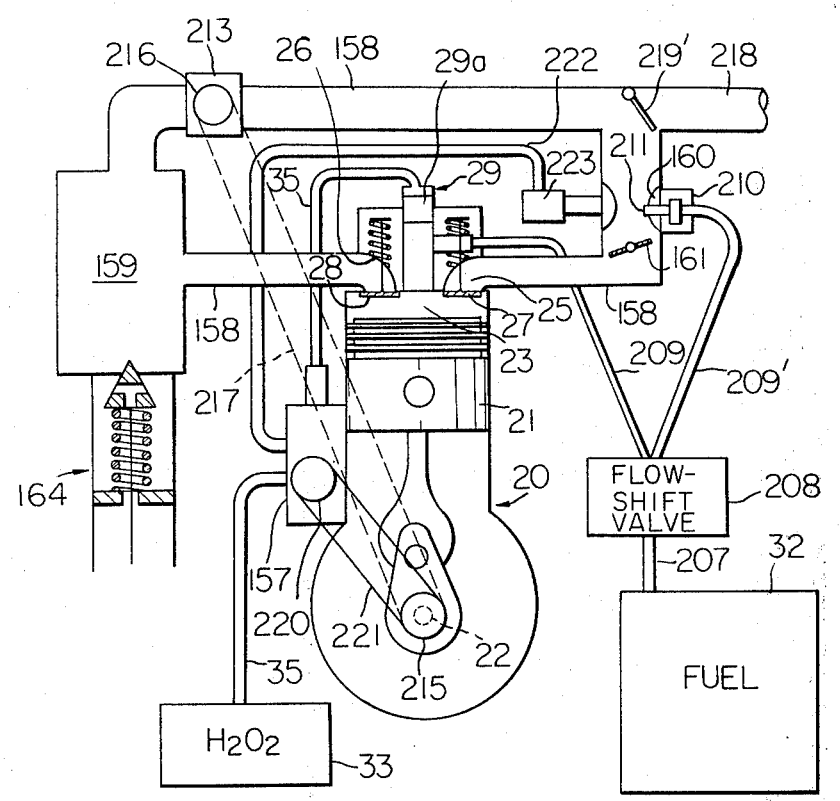

FIG. 15 is a schematic view showing a preferred example of a control arrangement for valves incorporated in the internal combustion engine illustrated in FIG. 14; and FIG. 16 is a schematic view showing a modification of the internal combustion engine illustrated in FIG. 15. de Reference will now be made to the drawings, first to FIG. 1 which illustrates a preferred embodiment of the internal combustion engine according to the present invention. The internal combustion engine herein shown is of the four-cycle reciprocating-piston type, including an engine cylinder 20 and a piston 21 received in the cylinder bore and drivingly connected to a crankshaft 22 through a connecting rod and crankpins (not shown), as customary. A combustion chamber 23 is defined between the top face of the piston 21 and a cylinder head 24 which forms an end wall of the cylinder 20. This cylinder head 24 has formed therein intake and exhaust ports 25 and 26, respectively, which are opened into the combustion chamber 23. Between the combustion chamber and these intake and exhaust ports 25 and 26 are positioned intake and exhaust valves 27 and 28, respectively, which are adapted to open and close the intake and exhaust ports in cycles synchronized with the rotation of the crankshaft 22. The intake and exhaust valves 27 and 28, respectively, are of the well known constructions, having valve guides, valve springs and spring retainers as schematically illustrated in the drawing.

The cylinder head 24 carries thereon a three-way fluid injection valve 29 of the construction to be described later. The fluid injection valve 29 has inlet port 30 and 31 which are in communication with a source 32 of a liquid or gaseous fuel and a source 33 of an oxiding gas such as a hydrogen peroxide or oxygen gas through passageways 34 and 35, respectively. The passageway 34 has incorporated therein a fuel feed pump 36 which is driven to feed the liquid or gaseous fuel from the fuel source 32 to the fluid injection valve 29. The fuel thus delivered to the fluid injection valve 29 is mixed with the hydrogen peroxide or oxygen gas from the oxidizing gas source 33. Where the oxiding gas of the hydrogen peroxide is used, the hydrogen peroxide exothermically decomposes into water and oxygen instantaneously upon contacting the fuel in the fluid injection valve 29 and produces a great amount of heat of a temperature of, say, the order of 700°C. In this instance, the oxidizing gas supply passageway 35 may be provided with a catalyst such as for example a silver-based catalyst for accelerating the exothermic decomposition of the hydrogen peroxide. The fuel which may be in the form of hydrocarbons is thus combusted to the temperature of about 2,000°C and the resultant combustion gases enter the combustion chamber 23 through an outlet port 37 which is formed in the cylinder head 24.

The exhaust port 26 is in communication with an exhaust passageway comprising a branched conduit 38 incorporating therein an exhaust recirculation pump 39 which is driven by the crankshaft 22, through pulleys 40 and 40' and an endless belt 41 at a speed proportional to the engine driving speed. The exhaust passageway 38 is branched into an exhaust discharge passageway 42 opened to the atmosphere through a flow control valve 43 and an exhaust recirculation passageway 44 having a flow control valve 45, a constriction or venturi 46 and an exhaust reservoir 47 and terminating in the intake port 25 of the combustion chamber 23. The flow control valve 45 is operated from the outside of the engine for controlling the rate of flow of the exhaust gases to be recirculated into the combustion chamber 23 through the passageway 44 and accordingly an output power of the engine. A suction sensor 48 detects the flow rate of the exhaust gases passing through the venturi 46 upon sensing of the suction built up therein so as to control in a suitable manner the delivery rate of the fuel feed pump 36 and the position of the flow control valve 43 for supplying the fuel fluid injection valve 29 and discharging the exhaust gases to the outside of the engine at rates which are dictated by the rate of flow of the exhaust gases to be recirculated to the combustion chamber 29.

As previously noted, the fuel supplied from the source 32 is in the form of either a hydrogen gas or hydrocarbons such as kerosene and, as a consequence, the exhaust gases resulting from the combustion of the fuel in the combustion chamber 23 will be comprised solely by water vapour or a mixture of water vapour and carbon dioxide. The exhaust gases of the water vapour or the mixture of the water vapour and carbon dioxide are pumped through the exhaust passageway 38 by the exhaust recirculation pump 39 and are recirculated into the combustion chamber 23 through the exhaust recirculation passageway 44 during intake strokes of the piston 22 at a rate which is determined by the selected position of the flow control valve 45. The exhaust gases thus fed to the combustion chamber 23 serve to dilute the combustion gases produced therein for reducing the temperature of the hot combustion gases to an appropriate engine operating temperature range and adding to the quantity of the gases to work on the piston 21. When the exhaust recirculation flow control valve 45 is driven to a part-throttle or closed throttle position to limit the flow rate of the recirculated exhaust gases, then the suction sensor 48 senses the increased suction in the venturi 46 and operates the fuel feed pump 36 and exhaust discharge flow control valve 43 to deliver the fuel to the fluid injection valve 29 at a reduced rate and to partially deliver the exhaust gases to the outside of the engine through the exhaust discharge passageway 42.

The output power of the internal combustion engine above described is substantially proportional to the quantity of the exhaust gases recirculated into the combustion chamber 23 and the quantity of the recirculated exhaust gases, in turn, is largely proportional to a product of a degree of opening of the exhaust recirculation flow control valve 45 and a delivery rate of the exhaust recirculation pump 39. Since the delivery rate of the exhaust recirculation pump 39 is proportional to the revolution speed of the engine, the output power of the engine is substantially proportional to the product of the degree of opening of the exhaust recirculation flow control valve 45 and the revolution speed of the engine. This will mean that the operation principle of the engine above described is substantially in agreement with that of the usual internal combustion engines using the combustible mixture of the fuel and air.

The additional working fluid, which has been assumed to be the exhaust gases recirculated from the exhaust passageway 38, may be supplied from an independent source of, for instance, water or air, where desired. In this instance, the exhaust recirculation pump 39, exhaust discharge flow control valve 43 and exhaust recirculation passageway 44 should be removed from the arrangement shown in FIG. 1. If it is desired to use the water as the additional working fluid, then suitable means may be provided to inject the water into the combustion chamber 23 at a controlled rate so that water vapour is produced in the combustion chamber by the heat of the hot combustion gases produced therein. If, on the other hand, it is desired that air is used as the additional working fluid, then a suitable air intake means may be attached to the engine cylinder so atmospheric air is fed to the combustion chamber 23 through the intake port 25. The use of the air as the additional working fluid would result in production of an appreciable amount of toxic nitrogen oxides in the exhaust gases but the concentration of the nitrogen oxides will be limited to a practically permissible range through use of suitable countermeasures because the air is supplied to the combustion chamber only at a limited rate and the temperature of the gases in the combustion chamber is considerably reduced by the air itself.

Figure 2:
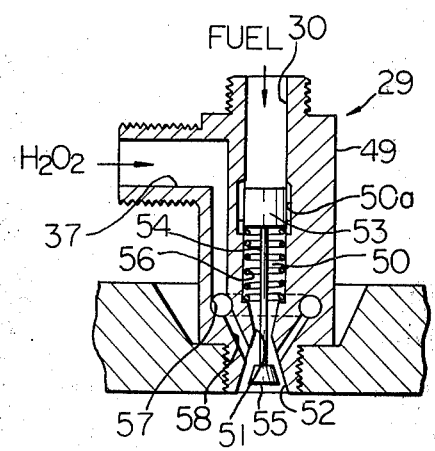
FIG. 2 is a longitudinal section view showing, on an enlarged scale, a preferred example of a fluid injection valve for use in the internal combustion engine illustrated in FIG. 1.

The fluid injection valve 29 forming part of the internal combustion engine above described may be constructed in any desired manner, a preferred example of the valve being shown in FIG. 2. Referring to FIG. 2, the fluid injection valve 29 comprises a valve housing 49 in which the fuel inlet port 30 and oxidizing gas inlet port 31 are formed. The fuel inlet port 30 merges into a valve chamber which includes a cylindrical bore 50, a constriction or venture section 51 and an enlarged nozzle portion 52 opened to the combustion chamber 23. The cylindrical bore 50 has an enlarged portion 50a which is in the form of a circumferential groove formed in the valve housing 49 defining the bore 50 and which is spaced apart from the constriction 51 interventing between the bore 50 and nozzle portion 52, as illustrated. A piston 53 acting as a valve spool is axially slidably received in the cylindrical bore 50 and is adapted to be brought into alignment with the enlarged portion 50a of the bore 50 when moved to a predetermined position which is illustrated. A piston rod 54 projects from the piston 53 and extends into the nozzle portion 52 through the cylindrical bore 50 and constriction 51. The piston rod 54 carries at its leading end a valve head 55 having an enlarged end. The nozzle portion 52 and this valve head 55 have cross sections which are substantially concentric with each other and which are enlarged toward their ends facing the combustion chamber 23. A preload spring 56 is seated at one end on piston 53 and at the other on a stepped end wall of the cylindrical bore 50 adjacent the constriction 51 so that the piston 53 is urged away from the constriction 51, viz., toward the fuel inlet port 30 or toward a position in which the piston 53 closes the enlarged portion 50a in the bore 50.

The inlet port 31 for the oxidizing gas, on the other hand, is in communication with an annular passageway or chamber 57 formed in the valve housing 49. The annular passageway 57 encircles the valve chamber above described and communicates with the nozzle portion 52 of the valve chamber through a passageway 58.

When the engine is at rest so that no fuel is fed to the fuel inlet port 30 so the fluid injection valve 29 above described, the piston 53 is held by the action of the preload spring 56 in a position closing the enlarged portion 50a of the cylindrical bore 50 and accordingly the valve head 55 is held in a position to close the nozzle portion 52 for shutting off the flow of the oxidizing gas in the inlet port 31. When, then, the engine is driven so that the fuel feed pump 36 (FIG. 1) delivers the fuel into the fuel inlet port 30 of the fluid injection valve 29, then the piston 53 is subjected to the pressure of the pumped fuel and axially moved against the action of the preload spring 56 to a position aligned with the enlarged portion 50a of the cylindrical bore 50 as indicated in FIG. 2. Under this condition, the valve head 55 is moved toward the enlarged end of the nozzle portion 52 so that uninterrupted communication is established between the fuel inlet port 30 of the fuel injection valve 29 and the combustion chamber 23 of the engine cylinder 20 through the enlarged portion 50a of the cylindrical bore 50, constriction 51 and nozzle portion 52. The fuel in the liquid or gaseous state is consequently passed through the nozzle portion 52 at a high velocity so that the oxidizing gas is sucked in from the inlet port 31 into the nozzle portion 52. The rate of passage of the fuel from the inlet port 30 to the combustion chamber 23 continuously increases as the pressure of the fuel acting on the piston 53 increases and accordingly the valve head 55 is moved toward the enlarged end of the nozzle portion 52 which is opened into the combustion chamber 23. In this condition, the oxidizing gas is delivered to the nozzle portion 52 at an increased rate so that the ratio between the quantities of the fuel and oxidizing gas is maintained substantially constant throughout the varying driving conditions of the engine. Although the internal combustion engine shown in FIGS. 1 and 2 has been assumed to be of the fourcycle single-cylinder type, such is merely by way of example and the construction of the engine therein shown may be applied to reciprocating-piston engines of any desired types including two-cycle engines, multi-cylinder engines and jump-spark ignition or compression-ignition engines.

Figure 3:
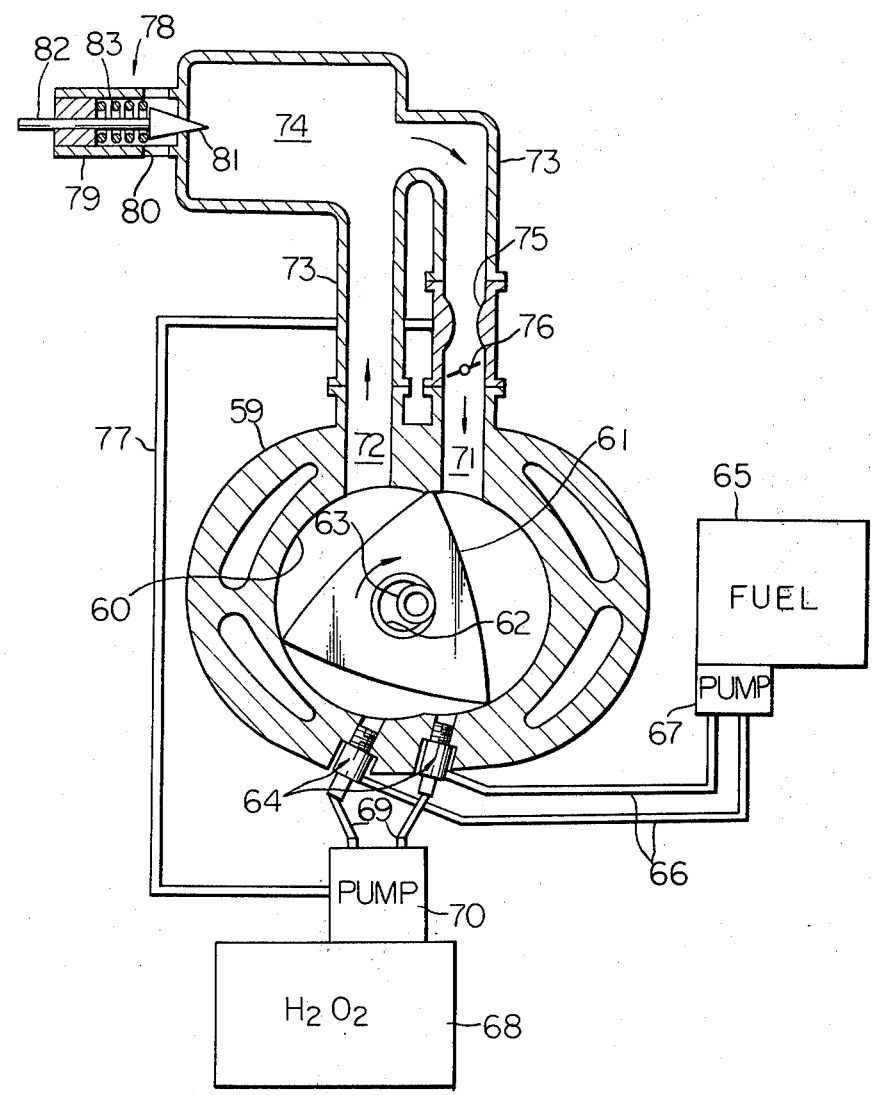
FIG. 3 is a schematic cross sectional view showing a rotary-piston internal combustion engine according to the present invention.

FIG. 3 illustrates another preferred embodiment of the internal combustion engine according to the present invention, wherein the engine is shown as being of the Wankel rotary-piston type.

The Wankel rotary-piston engine as shown includes a rotar housing 59 having an epitrochoidal combustion chamber 60 in which a three-lobe rotor 61 rotates. The rotor 61 is mounted on a crankshaft (not shown) through internal gears 62 formed on the rotor and external gears 63 formed on a rotor shaft. Since the construction and operation of the Wankel rotary-piston engine is well known in the art and since such are rather immaterial for the understanding of the features of the present invention, no further description will be herein resorted to for simplicity of description.

The exhaust emission of the rotary-piston engine contains the harmful carbon monoxide and unburned hydrocarbons in concentrations which are significantly higher than those of such compounds contained in the exhaust gases emitted from the usual reciprocating piston internal combustion engines, as is widely pointed out. Various exhaust cleaning systems have therefore been thus far proposed to eliminate the carbon monoxide and unburned hydrocarbons in the exhaust gases from the rotary-piston engines, representative of which exhaust cleaning systems may be the thermal reactors and oxidizing catalysts for positively re-oxidizing the combustible residues in the exhaust emission. In view, however, of the considerably enlarged construction of the engine using such an exhaust cleaning system and of the considerable amount of heat generated in consequence of the re-combustion of the combustible residues, the exhaust cleaning systems presently proposed are not fully acceptable especially for use in motor vehicles, let alone the face that the toxic compounds can not be removed prefectly from the exhaust gases even through the exhaust gases are thus re-combusted in the exhaust systems of the engines. It is also pointed out that the exhaust gases from the rotary-piston engines contain appreciable amounts of nitrogen oxides although the concentrations thereof are limited to levels which are permissible under the various local anti-smog regulations presently in force. It is, however, apparently preferred to completely eliminate the nitrogen oxides in the exhaust gases and, thus, efforts are being made in various quarters of the industry in quest of further advanced air-pollution preventive devices for use in the rotary-piston engines which are in increasing demand.

For the elimination of the carbon monoxide and unburned hydrocarbons in the exhaust gases from the rotary-piston engines, it is important that the combustible mixture be combusted in the engine at an increased efficiency and, for the prevention the production of the nitrogen oxides under such combustion conditions, the fuel should be combusted without aid of an oxidizing agent containing element nitrogen. This can be achieved successfully through utilization of the new principle of combustion which is proposed by the present invention in which the fuel is combusted with the agency of the oxidizing gas of the hydrogen proxide or oxygen as previously described.

In accordance with the present invention, the rotary-piston engine includes as illustrated in FIG. 3, the rotor housing 59 carries a pair of fluid injection valves 64 having outlets which are opened into a combustion space of the combustion chamber 60. It is thus assumed that two fluid injection nozzles are used on the rotary-piston engine herein shown for the purpose of utilizing the two plug holes provided in the usual existing rotary-piston engine but only one or even more than two such fluid injection valves may be used where desired. The detailed construction in a preferred form of the injection valve 64 will be described later. Each of the fluid injection valves 64 has two inlet ports, one of which is in communication with a source 65 of a fuel through a fuel feed passageway 66 and a fuel feed pump 67 and the other of which is in communication with a source 68 of an oxidizing gas such as the hydrogen peroxide or oxygen gas through an oxidizing gas supply passageway 69 and oxidizing gas feed pump 70. The fuel source 65 stores therein a liquid or gaseous fuel which may be in the form of hydrocarbons or hydrogen gas as previously mentioned and the fuel feed pump 67 associated therewith may be driven from the crankshaft (not shown) of the engine.

The rotor housing 59 has formed therein intake and exhaust ports 71 and 72, respectively, which are in communication with each other through an exhaust recirculation passageway 73 incorporating an exhaust reservoir 74, a constriction or venturi 75 and a flow control valve 76. The venturi 75 is positioned downstream of the exhaust reservoir 74 while the flow control valve 76 positioned downstream of the venturi 75. Thus, the exhaust gases discharged from an exhaust space of the combustion chamber 60 are recirculated to an intake space of the combustion chamber through the exhaust recirculation passageway 73 at a rate regulated by the flow control valve 76 which is usually driven from the outside of the engine. The rate of flow of the oxidizing gas delivered to the fluid injection valves 69 is controlled by varying the delivery rate of the oxidizing gas feed pump 70 through detection of the suction obtaining in the venturi 75 by a suction detecting conduit 77 leading from the pump 70 and opening into the venturi 75. The exhaust reservoir 74 is preferably provided with a relief valve unit 78 which is operative to allow the exhaust gases to the outside of the engine when the pressure of the exhaust gases drawn into the reservoir is about to exceed a predetermined level. The relif valve unit 78 thus comprises a valve housing 79 having a vent 80 opened to the atmosphere. A valve head 81 projects at its tapered end portion into the exhaust reservoir 74 through an aperture formed in the wall defining the reservoir. The valve head 81 is axially movable through this aperture under the guidance of a valve guide 82 which is axially slidably carried on the valve housing 79. A preload spring 83 is seated at one end on an end wall of the valve housing 79 and at the other on a rear end of the valve head 81, thereby biasing the valve head 81 toward a position closing the aperture in the wall of the exhaust reservoir 74.

In operation, the liquid or gaseous fuel of hydrocarbons or hydrogen is continuously pumped by the fuel feed pump 67 from the fuel source 65 to the fluid injection valves 64 via the fuel feed passageways 66 and concurrently the oxidizing gas such as the hydrogen peroxide or oxygen gas is pumped by the pump 70 from the oxidizing gas source 68 to the fluid injection valves 64 through the oxidizing gas supply passages 69. Where the hydrogen peroxide is utilized as the oxidizing gas, the peroxide rapidly decomposes upon contact with the fuel from the passageways 66 and produces a great amount of heat. Such decomposition of the hydrogen peroxide gas can be accelerated through provision of a silver-based or other suitable catalyst in each of the fluid injection valves 64 as will be described. The fuel entering the fluid injection valves 64 is in this manner combusted by the heat thus generated by the exothermic decomposition of the hydrogen peroxide gas or by the hot oxygen gas and the resultant combustion gases cause a pressure on the rotor 61. Under this condition, the hot combustion gases directed into the combustion space of the chamber 60 are admixed to the exhaust gases which have been recirculated into the combustion chamber 60 through the intake port 71 during the preceding combustion cycle of the engine. The hot combustion gases in the combustion space are thus diluted with the recirculated exhaust gases with the result that the rotor 61 is worked upon by an increased amount of fluid and the temperature of the hot combustion gases is reduced to, say, the order of 1,000°C in view of the heat resistance of the component parts of the engine.

The rate of the flow of the exhaust gases recirculated to the combustion chamber 61 is controlled by the externally operated flow control valve 76 depending upon the amount of load applied to the engine. If, in this instance, the pressure of the exhaust gases admitted to the exhaust recirculation passageway 73 reaches a predetermined elevated level, then the pressure acts on the valve head 81 of the relief valve unit 78 on the exhaust reservoir 74 so that the valve head 81 withdraws against the action of the preload spring 83 for allowing the exhaust gases in the reservoir 74 to escape outwardly of the engine through the aperture in the wall of the reservoir and the vent 80 formed in the valve housing. The pressure of the exhaust gases in the exhaust recirculation passageway 73 is in this manner at all times maintained under the predetermined level throughout the varying driving condition of the engine. Since, in this instance, the exhaust gases contain only the water vapour or the mixture of the water vapour and carbon dioxide depending upon the type of the fuel used, the gases discharged to the outside of the engine through the relief valve unit 78 are completely harmless. Where it is feared that the quantity of the exhaust gases to be recirculated to the combustion chamber 60 is insufficient to achieve satisfactory operation of the engine as in the case of starting or rapidly accelerating the engine, the exhaust reservoir 74 may be further provided with suitable air inlet means responsive to the pressure of the exhaust gases lower than a predetermined limit and capable of introducing the atmospheric air into the reservoir 74 as soon as the pressure drops under the predetermined level. The introduction of the air into the exhaust gases will result in production of an appreciable amount of nitrogen oxides but, since the air is introduced only temporarily and at a limited rate, no serious problem will arise as a consequence of the use of air. Should it, however, be strongly desired to completely prevent the production of the nitrogen oxides in the exhaust gases, the exhaust recirculation passageway 73 or particularly the exhaust reservoir 74 may be provided with suitable storage means adapted to temporarily store an excess of exhaust gases for releasing the stored exhaust gases into the passageway 73 or reservoir 74 in the event the pressure of the exhaust gases has lowered to a predetermined level during, for example, starting or rapid acceleration of the engine.

Figure 4:
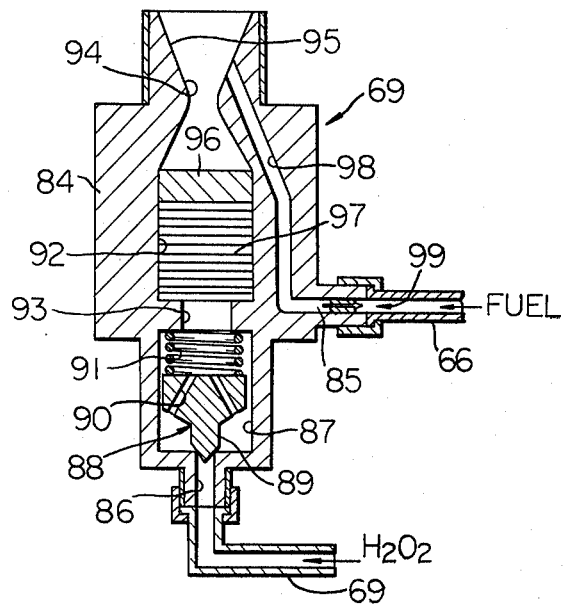
FIG. 4 is a longitudinal sectional view showing, on an enlarged scale, a preferred example of a fluid injection valve adapted to be used in the internal combustion engine shown in FIG. 3.

A preferred example of the construction of the fluid injection valve 64 is illustrated in FIG. 4. The fluid injection valve 64 comprises a valve housing 84 having two separate inlet ports 85 and 86 into which the fuel feed and oxidizing gas supply passageways 66 and 69, respectively. The oxidizing gas inlet port 86 opens into a chamber 87 formed in one end portion of valve housing 84. The chamber 87 accommodates therein a one-way check valve member 88 which is axially movable within the chamber 87. The one-way check valve member 88 has a tapered axial projection 89 extending toward the inlet port 86 and a passageway 90 providing constant communication across the valve member 88 in the chamber 87. A preload spring 91 is seated at one end on an annular end wall of the chamber 87 opposite to the inlet port 86 and at the other on the valve member 88 for biasing the valve member toward a position to close the inlet port 86 by its axial projection 89 as indicated in FIG. 4. The valve housing 84 is further formed with a chamber 92 with which the above described chamber 87 is constant communication through an aperture 93 defined by the annular end wall of the chamber 87. The second chamber 92 merges into a constriction 94 which in turn merges into a nozzle portion 95 having a section which is enlarged toward its end. A swirler element 96 is positioned between the chamber 92 and constriction 94 for building up a vortical stream of fluid passing therethrough. Where the hydrogen peroxide gas is used as the oxidizing gas for the fuel in the shown engine, a catalyst 97 of, for instance, a silver-based material is preferably positioned upstream of this swirler element 96 in the chamber 92 so that the exothermic decomposition of the hydrogen peroxide is accelerated.

The fuel inlet port 85 leading from the fuel feed passageway 66 is in communication with a passageway 98 which is formed in the valve housing 84 and which opens into the nozzle portion 95 downstream of the constriction 94. In the fuel feed passageway 66 and immediately upstream of the fuel inlet port 85 is positioned a one-way check valve 99 which is adapted to permit the flow of the fuel into the inlet port 85 and prevent the fuel from flowing in a reverse direction from the inlet port 85.

The fluid injection valve 69 being constructed in a manner above described, the oxidizing gas such as the hydrogen peroxide directed into the inlet port 86 to the chamber 87 first act on the tapered axial projection 89 of the one-way check valve member 88 closing the inlet port 86 and moves the valve member 89 away from the inlet port 86 against the action of the preload spring 91 so that the projection 89 of the valve member 88 leaves the inlet port 86. The hydrogen peroxide gas is consequently admitted to the chamber 87 and passed over to the second chamber 92 through the passageway 90 formed in the valve member 88 and the aperture 91 providing the communication between the two chambers 87 and 92. If, in this instance, the gas pressure obtaining downstream of the one-way check valve 88 happens to become higher than that established upstream of the valve member 88 for some reason, the valve member 88 is forced toward the inlet port 86 which is consequently closed by the axial projection 89 of the valve member so that the oxidizing gas drawn into the chamber 87 is prevented from flowing in a reverse direction into the inlet port 86.

The hydrogen peroxide gas entering the second chamber 92 rapidly decomposes into a mixture of water and oxygen as it passes through the catalyst 97 and produces a great amount of heat as a result of the exothermic decomposition. The flow of the hot mixture of the water vapour and oyxgen gas is then swirled by the swirler element 96 positioned downstream of the catalyst 97 and the resultant vortical stream of the hot gases spurts into the nozzle portion 95 through the constriction 93 at an elevated velocity so that a suction is built up in the nozzle portion 95. The suction draws the fuel from the passageway 66 through the fuel inlet port 85 and causes the fuel to be instantaneously combusted by means of the heat of the hot mixture of the water vapour and oxygen gas containing nascent oxygen in a considerable proportion.

It is apparent that the catalyst 97 may be dispensed with where the oxygen gas is utilized as the oxidizing gas for the fuel in lieu of the hydrogen peroxide.

The embodiment of the rotary-piston internal combustion engine above described is adapted to mix the liquid or gaseous fuel directly with the oxidizing gas entering the combustion chamber of the engine. Where desired, however, the liquid or gaseous fuel may be mixed with the exhaust gases being recirculated to the intake port of the combustion chamber so that the oxidizing gas of the hydrogen peroxide or oxygen is mixed with the mixture of the fuel and the recirculated exhaust gases in the combustion space of the combustion chamber, a preferred form of such an embodiment being illustrated in FIG. 5.

Figure 6:
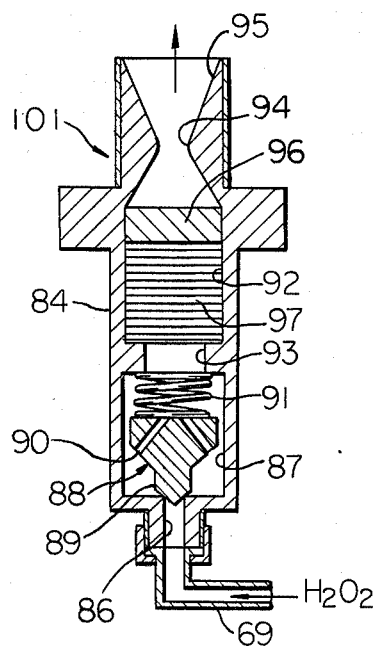
FIG. 6 is a longitudinal sectional view showing, on an enlarged scale, a preferred example of a fluid injection valve for use in the internal combustion engine illustrated in FIG. 5.
Figure 5:
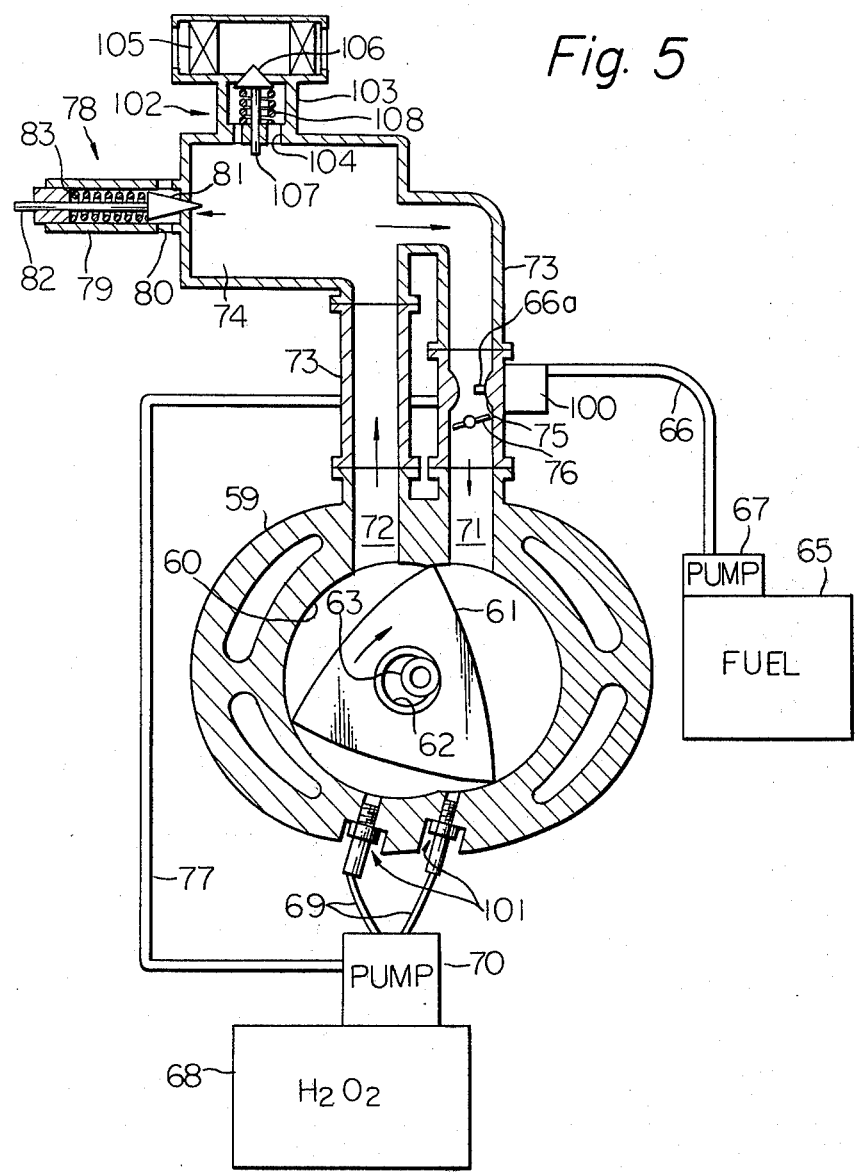
FIG. 5 is a schematic cross sectional view showing another rotary-piston internal combustion engine embodying the present invention.

The embodiment shown in FIG. 5 is a simple modification of the embodiment shown in FIG. 3 and as such like reference numerals designate corresponding parts and elements in both figures. In the rotary-piston internal combustion engine shown in FIG. 5, the fuel feed passageway 66 leading from the source 65 of the liquid or gaseous fuel through the fuel feed pump 67 terminates at a jet nozzle 66a which opens into the constriction or venturi 76 of the exhaust recirculation passageway 74. Where the fuel in a liquid state is to be used, a carburetor 100 may preferably be positioned immediately upstream of the jet nozzle 99 for atomizing the liquid fuel before it is injected into the venturi 75. The passageways 69 leading from the oxidizing gas feed pump 70 terminate respectively in fluid injection valves 101 which are opened at its outlet ports into the combustion space of the chamber 60. These fluid injection valves 101 may be constructed in any desired manner, a preferred example being illustrated in FIG. 6. The construction of the fluid injection valve 101 shown in FIG. 6 is essentially similar to the valve illustrated in FIG. 4, including the one-way check valve member 88, outwardly enlarged nozzle 95 and swirler element 96 and, further, the catalyst 97 where the hydrogen peroxide is used as the oxidizing gas for the fuel. Since, however, the fuel is delivered to the exhaust recirculation passageway 73 in the engine shown in FIG. 3, the fluid injection valve 69 illustrated in FIG. 4 is void of the fuel inlet port 85 and the passage 98 which are provided in the fluid injection valve of FIG. 4.

Thus, the fuel pumped from the fuel source 65 into the venturi 75 through the fuel feed passageway 66 and, where the liquid fuel is used, further through the carburetor 100 mixes with the exhaust gases which are recirculated through venturi 75 from the exhaust reservoir 74 and the resultant mixture of fuel and exhaust gases is admitted into the combustion chamber 60 in the intake stroke. The mixture is compressed as the rotor 61 revolves in the chamber 60 and is brought into contact in the combustion stroke of the engine with the hot gases ejected into the combustion space of the chamber 60 from the fluid nozzles 101 whereby the fuel is combusted instantaneously for causing a pressure on the rotor 61. The resultant exhaust gases are discharged to the exhaust recirculation passageway 73 and are recirculated into the combustion chamber 60 together with the fuel from the jet nozzle 99 in the subsequent combustion cycle. The exhaust reservoir 74 forming part of the exhaust recirculation passageway 73 of the rotary-piston engine herein shown in equipped not only with the pressure relif valve unit 78 of the described character but an air inlet valve unit 102 which is adapted to supply additional air into the exhaust reservoir when the quantity of the exhaust gases recirculated to the combustion chamber 60 is insufficient for achieving satisfactory combustion conditions as in the case of starting or rapidly accelerating the engine. The air inlet valve unit 102 comprises a valve housing 103 which is in constant communication with the interior of the exhaust reservoir 74 through apertures 104 and carries thereon an air cleaner 105 which is vented to the open air. The valve housing 103 communicates with the air cleaner 105 through an aperture which is formed in a partition intervening between the valve housing 103 and air cleaner and a valve head 106 which is movable through the aperture between the valve housing 103 and air cleaner 105 under the guidance of a valve guide 107 which is movable through the wall of the reservoir 74. A preload spring 108 is positioned within the valve housing 103 in a manner to urge the valve head 106 toward a position to close the aperture between the valve housing 103 and air cleaner. The air inlet valve unit 102 thus has its valve head 106 held in the position to close the aperture between the valve housing 103 and air cleaner 105 when the pressure obtaining in the exhaust reservoir 74 is higher than a predetermined limit. When the pressure in the reservoir 74 drops beyond this predetermined level which is usually subatmospheric, then a suction is built up in the valve housing 103 so that the valve head 106 is moved away from the aperture between the valve housing 103 and air cleaner 105 for allowing atmospheric air into the exhaust reservoir 74 through the air cleaner 105, valve housing 103 and apertures 104 in the wall of the reservoir 74 until the pressure in the reservoir 74 restores a level higher than the predetermined limit. As previously mentioned, introduction of air into the combustion chamber 60 in the above described manner will result in production of an appreciable amount of toxic nitrogen oxides in the exhaust gases but practically no problem will arise therefrom because the air is admitted to the combustion chamber 60 only temporarily and at a limited rate.

The rotary-piston engine of the construction shown in FIG. 3 or 5 is not only adapted to eliminate the toxic compounds in the exhaust emission but features simple and economical construction because no positive ignition means such as the usual spark plugs and associated electrical devices are used for firing the fuel. It is, however, apparent that the engine may be modified so that the fuel is combusted with the agency of water vapour or atmospheric air in lieu of the hydrogen peroxide or oxygen gas and by the aid of the spark plugs.

FIG. 7 illustrates a preferred example of a fluid injection valve which is specifically adapted for use in a compression-ignition or diesel engine.

In the diesel engines operating on the usual combustion principles using compressed air and a fuel of hydrocarbons, it is important that the air be compressed at extremely high ratios during compression strokes so that considerable intricate and costly constructions of the engine result. Where, however, the fuel is combusted with the agency of the hydrogen peroxide as proposed by the present invention, heat of a temperature with is enough to ignite the fuel can be achieved without use of the highly compressed air. Thus, not only the emission of the toxic compounds such as the carbon monoxide, hydrocarbons and nitrogen oxides are eliminated in the exhaust gases but the construction of the engine can be significantly simplified and made economical if the features provided by the present invention are incorporated in the diesel engine.

Referring to FIG. 7, the fluid injection valve for the diesel engine according to the present invention comprises a valve housing 109 which is carried on a cylinder head 110 positioned atop a combustion chamber 111. The valve housing 109 has formed therein a substantially cylindrical bore 112 which communicates upstream with a fuel inlet port 113 and downstream with an outwardly enlarged mixture outlet nozzle 114 through a constriction 115. The fuel inlet port 113 is in communication with a source (not shown) of a suitable liquid or gaseous fuel such as kerosene, while the mixture outlet nozzle 114 opens into the combustion chamber 111 at its enlarged end. A piston cylinder 16 is held in position within the cylindrical bore 112 in the valve housing 109, having an aperture 117 formed in its end wall facing the fuel inlet port 113 and an aperture 118 formed in its end portion close to the constriction 115. A piston 119 is axially slidably received in the piston cylinder 116 and a piston rod 120 extends from the piston 119 into the mixture outlet nozzle 114 through the constriction 115. The piston rod 120 carries at its leading end positioned in the nozzle 114 a valve head 121 which is enlarged toward its end at an angle in agreement with the angle at which the nozzle 114 is enlarged toward its end. A preload compression spring 122 is seated at one end on an end wall of the piston cylinder 116 adjacent the aperture 118 and at the other on the face of the piston 119, biasing the piston 119 toward the end wall defining the aperture 117 so that the valve head 121 is urged to a position to close the mixture outlet nozzle 114 as indicated by broken lines in FIG. 7. Between the inlet port 113 and the adjacent end wall of the piston cylinder 116 is positioned a one-way check valve 123 which is adapted to prevent the reverse flow of the fuel from the cylindrical chamber 112 to the inlet port 113. The one-way check valve 123 comprises an annular seat member 124 having an aperture 125 and secured to the valve housing 109 in a position intervening between the fuel inlet port 113 and cylindrical chamber 112 in the housing 109. A preload compression spring 126 is seated at one end on the inner face of the seat member 124 and carries at the other end a valve element 127 which is in a disc form having a diameter large enough to close the apertured seat member 124 when contacting the member. The valve element 127 is positioned at a close proximity to the adjacent end wall of the piston cylinder 116 and, to provide uninterrupted communication 116, a suitable stop member or members 128 are mounted on the end wall of the piston cylinder 116 facing the valve element 127 as seen in FIG. 7.

The valve housing 109 is further formed with an oxidizing gas inlet port 129 which is in communication with a source (not shown) of the hydrogen peroxide through an oxidizing gas supply passageway 130. The oxidizing gas inlet port 129 communicates with a passageway 131 which is also formed in the valve housing 109. The passageway 131 opens into the mixture outlet nozzle 114, the outlet of the passageway 131 being so located as to be closed when the valve head 121 is in a position closing the nozzle 114 as indicated by the broken lines. Intermediate between the oxidizing gas inlet port 129 and passageway 130 is provided a one-way check valve 132 of any desired construction such as a construction similar to the one-way check valve 123. The one-way check valve 132 is thus herein shown as including an apertured seat member 133 which is fast on the passageway 130, a preload compression spring 134 seated on the seat member 133 and positioned downstream of the member, a valve element 135 carried on the end of the compression spring 134 and a stop member 136 which fast on the inlet port 129 as illustrated. In the diesel engine using multiple cylinders, the fluid injection valve of the above described construction is mounted on each of the cylinders and, for this purpose, the oxidizing gas inlet port 129 may be in communication with the passages 131 in the individual injection valves through a gallery 137 which is common to all of these passageways 131.

When, in operation, the liquid or gaseous fuel such as kerosene is pumped into cylindrical chamber 112 in the valve housing 109 through the fuel inlet port 113, aperture 125 in the seat member 124 and space between the seat member 124 and valve element 127 which is urged away from the seat member 124 by the action of the preload spring 126, as illustrated, the pressure of the fuel acts on the end face of the piston 119 through the aperture 117 formed in the end wall of the piston cylinder 116. The piston 119 is consequently forced away from the aperture 117 against the action of the preload compression spring 122 so that the valve head 121 is moved by the piston rod 120 from the position indicated by the broken lines to a position opening the mixture outlet nozzle 114. The fuel which has been directed into the cylindrical chamber 112 is thus permitted to flow into the mixture outlet nozzle 114 through the aperture 118 in the piston cylinder 116 and constriction 115. When, at this instant, the fuel spurts into the mixture outlet nozzle 114 from the constriction 115, a sudden pressure drop is caused in the flow of fuel so that the hydrogen peroxide gas which has been passed over to the oxidizing gas inlet port 129 from the passageway 130 is forcefully sucked in into the mixture outlet nozzle 114 and mixes with the fuel therein. Upon contact with the fuel in the nozzle 114, the hydrogen peroxide exothermically decompose into a hot active mixture of water and oxygen gas containing nascent oxygen in a great proportion and produces a large amount of heat. If, thus, the hot gases are admitted into the combustion chamber 111 in cycles which are in synchronism with the compression strokes of the piston, the fuel is readily combusted by the heat produced by the exothermic decomposition of the hydrogen peroxide and the piston driven at relatively low compression ratios of the gases produced from the hydrogen peroxide. Since, in this instance, two parts by weight of hydrogen peroxide constantly result in one part by weight of oxygen gas, the ratio between the quantities of fuel and oxygen can be made constant. An additional fluid such as the recirculated exhaust gases, water vapour or air may be supplied to the combustion chamber for the reasons previously noted and by the use of the arrangement previously described. Where it is not desired to have the air introduced into the combustion chamber, the fuel and hydrogen peroxide may be mixed with each other preferably at a ratio of 1:6 to 1:7. The quantity of the hydrogen peroxide should be appropriately reduced where the air is mixed with the gases in the combustion chamber.

The one-way check valves 123 and 132 serve to prevent the reverse flows of the fuel and hydrogen peroxide into the fuel inlet port 113 from the cylindrical chamber 112 and into the passageway 130 from the oxidizing gas inlet port 129 when the pressure in the mixture outlet nozzle 114 rises as a result of the combustion of the fuel therein. The fuel is pumped to the fuel inlet port 113 in such cycles as to establish a zero pressure in the chamber 112 during the compression strokes, the piston 119 is returned to the initial position by the action of the preload spring 122 in the absence of a pressure acting thereon so that the valve head 121 restores the position closing the mixture outlet nozzle 114 as indicated by the broken lines during the compression strokes.

For the purpose of accelerating the exothermic decomposition of the hydrogen peroxide before it reaches the outlet of the passage 131, a catalyst (not shown) of, for instance, a silver-based material may be positioned in the gallery 137.

The engine cylinder with which the fluid injection valve of the nature above described is of the usual construction which is well known in the art and therefore no description thereof may be necessitated herein.

Figure 8:
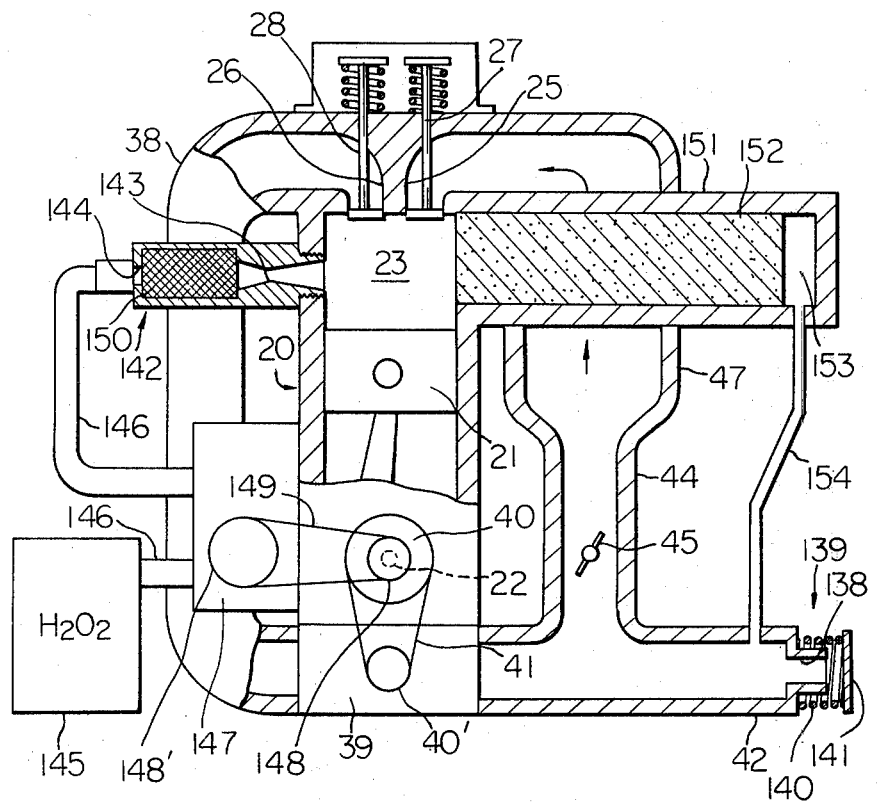
FIG. 8 is a schematic view showing partly in section another reciprocating-piston internal combustion engine according to the present invention.

As previously noted, the internal combustion engine according to the present invention is operable on any type of fuel including not only the liquid and gaseous fuel but the solid fuel which is usually in the form of hydrocarbons. FIG. 8 illustrates a preferred embodiment of the internal combustion engine using a solid fuel of waster plastics. The engine herein shown is thus expected to contribute to not only eliminating the emission of the toxic compounds in the exhaust gases but reducing the contamination resulting from the waste plastic material.

Figure 1:
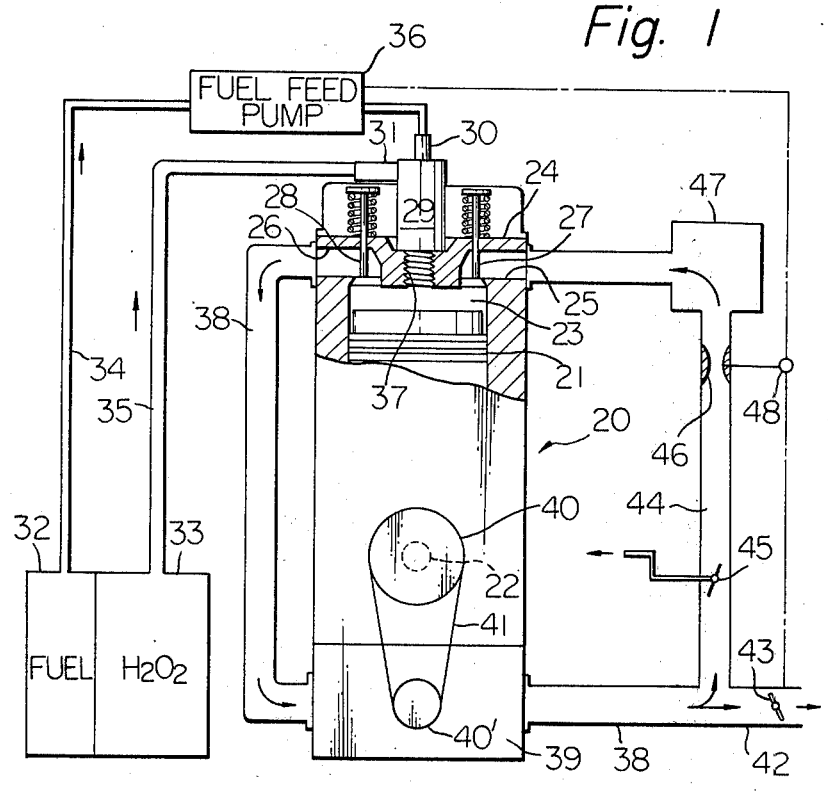
FIG. 1 is a schematic view showing, partly in section, a reciprocating-piston internal combustion engine embodying the present invention.

The internal combustion engine herein shown is exemplified as being of the four-cycle, reciprocating-piston type similarly to the engine shown in FIG. 1 and, as such, the parts and elements corresponding to those of FIG. 1 are designated by the same reference numerals in FIG. 8. Referring to FIG. 8, the internal combustion engine includes a combustion chamber 23 having intake and exhaust ports 25 and 26 which are provided with spring loaded intake and exhaust valves 27 and 28, respectively. The exhaust port 26 is communication with an exhaust passageway 38 incorporating therein an exhaust recirculation pump 39 which is driven by the crankshaft 22 of the engine cylinder 20 through driving and driven pulleys 40 and 40', respectively, and a belting 41 passed on the pulleys. The exhaust passage 38 is branched downstream of the exhaust recirculation pump 39 into an exhaust discharge passageway 42 and an exhaust recirculation passageway 44. The exhaust recirculation passageway 44 has incorporated therein a flow control valve 45 and an exhaust reservoir 47 positioned downstream of the flow control valve 45 and terminates in the intake port 25. The exhaust discharge passageway 42, on the other hand, terminates in an exhaust discharge port 138 which is opened to the outside of the engine. The exhaust discharge port 138 is provided with a one-way check valve 139 which is adapted to be open in response to an exhaust gas pressure higher than a predetermined level. Thus, the one-way check valve 139 is shown to include a preload tension spring 140 which is fast on a stepped wall portion defining the exhaust discharge port 138 and which carries at its end a valve element 141 having a working area which is enough to close the discharge port 138 when forced against the discharge port by the action of the tension spring 140.

The engine cylinder 20 carries thereon an oxidizing gas injection valve 142 having an outlet nozzle 143 which is opened into the combustion chamber 23. The injection valve 142 has an inlet port 144 which is in communication with a source 145 of a suitable oxidizing gas such as the hydrogen peroxide or oxygen through an oxidizing gas supply passageway 146 incorporating an oxidizing gas feed pump 147. The oxidizing gas feed pump 147 is driven by the crankshaft 22 of the engine through driving and driven pulleys 148 and 148', respectively, and an endless belting 149, similarly to the exhaust recirculation pump 39. Where the hydrogen peroxide is used as the oxidizing gas for the fuel to be described, the oxidizing gas injection valve 142 may preferably incorporate a catalyst 150 of, for instance, a sliver-based material as previously noted. The injection valve 142, which is only schematically illustrated in FIG. 8, may be constructed in any desired manner, for instance, similarly to the fluid injection valve of the construction shown in FIG. 6.

The engine cylinder 20 further carries thereon a solid fuel container 151 extending sidewise of the cylinder 20 and preferably in alignment with the nozzle 143 of the oxidizing gas injection valve 142. The fuel container 152 stores therein a solid fuel 152 in a rod form of waste plastics. This solid fuel rod 152 is axially movable in the fuel container 151 so that its forward end is at least partly exposed into the combustion chamber 23. At the end portion of the fuel container 151 opposite to the combustion chamber 23 is formed a back-pressure chamber 153 which is in constant communication with the exhaust discharge passageway 42 through a passageway 154. The exhaust gases admitted to the exhaust discharge passageway 42 is thus partially directed into the back-pressure chamber 153 behind the solid fuel rod 152 in the fuel container 151 so that the fuel rod 152 is substantially continuously fed toward the combustion chamber 23 by means of the pressure of the exhaust gases acting on the rear end of the fuel rod.

Where the hydrogen peroxide gas is used as the oxidizing agent for the fuel 152, the hydrogen peroxide exothermically decomposed into the mixture of water and oxygen when passed through the catalyst 150 in the oxidizing gas injection valve 142. The mixture which is heated to a temperature of about 700°C as previously explained is injected from the nozzle 143 into the combustion chamber 23 and forcefully impinges upon the exposed surface of the solid fuel rod 152 in the fuel container 151. Combustion thus takes place at the exposed surface of the fuel rod 152 and produces hot combustion gases of water vapour and carbon dioxide. The combustion gases are diluted with the exhaust gases which are recirculated into the combustion chamber through the exhaust recirculation passageway 47 and intake port 25 during the preceding intake stroke and the resultant hot mixture of the combustion gases and recirculated exhaust gases works on the piston 21. The exhaust gases emitted during the succeeding exhaust stroke are pumped by the exhaust recirculation pump 39 and are partly discharged to the outside of the engine via the exhaust discharge passage 42 and partly recirculated to the combustion chamber through the exhaust recirculation passageway 47 during the next intake stroke of the piston.

The internal combustion engine above described may be modified so as to supply water or atmospheric air to the combustion chamber in lieu of the recirculated exhaust gases. In this instance, the exhaust passageway 38 may dispense with the exhaust recirculation pump 39 and should be isolated from the intake port 25. The intake port 25 may be connected to suitable means for injecting water into the combustion chamber or to a suitable air intake valve unit.

Figure 9:
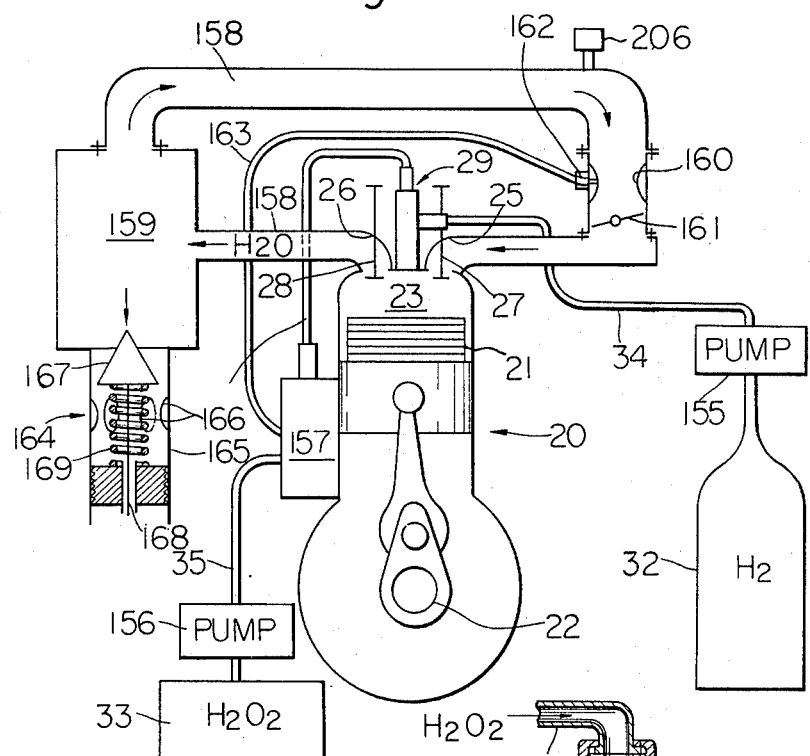
FIG. 9 is a schematic view showing still another reciprocating-piston internal combustion engine embodying the present invention.

FIG. 9 illustrates another preferred embodiment of the internal combustion engine according to the present invention. The internal combustion engine herein shown is adapted to operate on a gaseous fuel of hydrogen which is combusted with the agency of hydrogen peroxide so that no carbon oxides and nitrogen oxides are contained in the exhaust gases. Except for the use of the hydrogen gas as the fuel, the internal combustion engine shown in FIG. 9 is essentially similar to the internal combustion engine of the reciprocating-piston type shown in FIG. 1. Thus, the engine shown in FIG. 9 includes a combustion chamber 23 having intake and exhaust ports 25 and 26 which are provided with spring loaded intake and exhaust valves 27 and 28, respectively. A three-way fluid injection valve 29 has its outlet ports opened to the combustion chamber 23 and its inlet ports communicating respectively with sources 32 and 33 of hydrogen and hydrogen peroxide through passageways 34 and 35. The fuel feed passageway 34 is shown to have incorporated therein a pressure regulator 155 while the oxidizing gas feed passageway 35 is shown to have incorporated therein a feed pump 156 and a timed injection pump 157. The exhaust port 26 is in communication with an exhaust recirculation passage 158 having an exhaust reservoir 159, a constriction or venturi 160 positioned downstream of the reservoir and a flow control valve 161 positioned downstream of the venturi. The exhaust recirculation passageway 158 terminates in the intake port 25 so that the exhaust gases emitted to the exhaust port 26 are recirculated into the combustion chamber 23 at a rate controlled by the flow control valve 170 during the intake strokes of the piston 21. The hydrogen gas supplied from the source 32 is fed to the fluid injection valve 29 through the fuel passageway 34 at a rate which is controlled by the pressure regulator 155 while the hydrogen peroxide supplied from the source 33 is pumped by the feed pump 156 and injection pump 157 to the fluid injection valve 29 through the oxidizing gas supply passageway 35 in cycles synchronized with the intake strokes of the piston 21. The delivery rate of the injection pump 157 is controlled in relation to the rate of flow of the exhaust gases recirculated through the venturi 161 in the exhaust recirculation passageway 158. For this purpose, a suction sensor 162 is mounted on the venturi 161 so that the suction built up by the flow of the exhaust gases therethrough is carried over to the injection pump 157 through a suction conduit 163. The fluid injection valve 29 is provided with a catalyst (not shown) of, for instance, a silver-based material so that the hydrogen peroxide is exothermically decomposed into water and oxygen upon contact with the catalyst in the injection valve 29 and the resultant hot mixture of water and oxygen mixes with the hydrogen gas delivered into the injection valve 29. The mixture of the hydrogen gas and the hot water and oxygen is admitted into the combustion chamber 23 so that the hydrogen gas is combusted for producing hot water vapour which then works on the piston. The exhaust gases of the engine shown in FIG. 9 contain the water vapour alone so that entirely no toxic compounds are contained therein.

The exhaust reservoir 159 is shown as being provided with a pressure relief valve unit 164 which is adapted to discharge an excess of exhaust gases to the outside of the engine when the pressure of the exhaust gases in the reservoir 159 rises beyond a predetermined level. The pressure relief valve unit 164 thus includes a valve housing 165 which is fast on the exhaust reservoir 159 and which is formed with a number of apertures or vents 166. A valve head 167 is movable through an aperture formed in the wall of the reservoir 159, guided by a valve guide 168. The valve head 167 is biased toward a position to close the aperture in the wall of the reservoir 159 by means of a preload spring 169 which is accommodated within the valve housing 165. When the pressure of the exhaust gases in the exhaust reservoir 159 rises beyond the predetermined limit, then the pressure acting on the valve head 167 from the interior of the reservoir causes the valve head to retract from the initial position against the action of the preload spring 169 for opening the aperture in the wall of the reservoir so that the exhaust gases are discharged to the open air until the pressure in the reservoir drops to the predetermined level.

Figure 10:
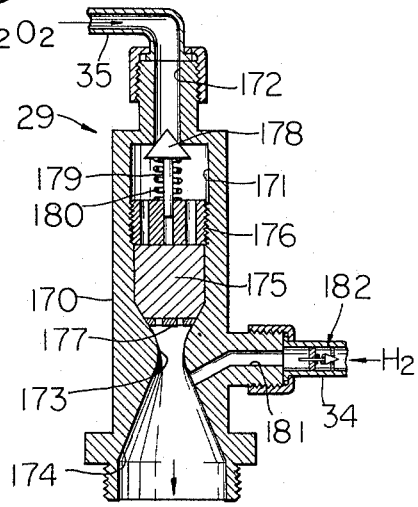
FIG. 10 is a longitudinal sectional view showing, on an enlarged scale, a preferred example of a fluid injection valve for use in the internal combustion engine illustrated in FIG. 9.
Figure 11:
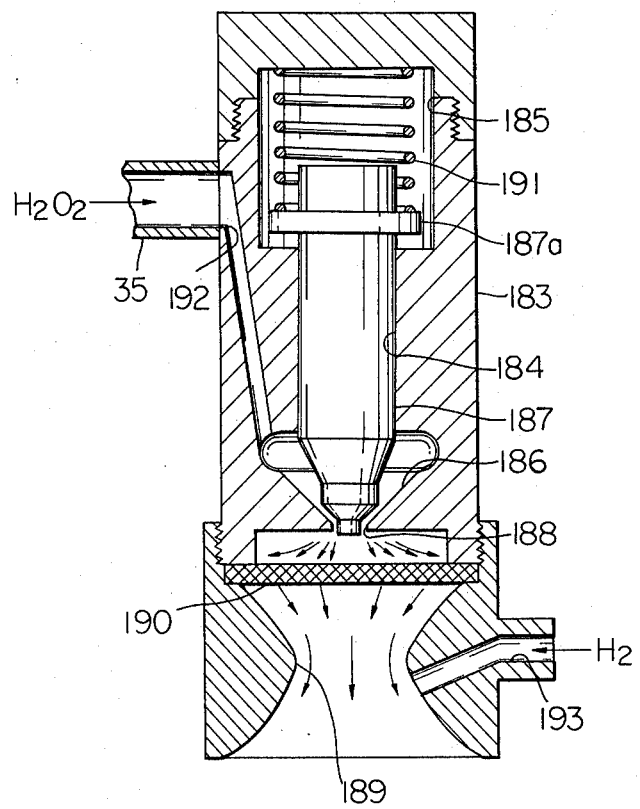
FIG. 11 is also a longitudinal sectional view showing another preferred example of the fluid injection valve for the internal combustion engine shown in FIG. 9.

FIGS. 10 and 11 illustrate preferred examples of the fluid injection valves 29 applicable to the embodiment of the internal combustion engine above described.

Referring first to FIG. 10, the fluid injection valve includes a valve housing 170 having a generally cylindrical bore 171. The cylindrical bore 171 communicates at one end with an inlet port 172 leading from the oxidizing gas supply passage 35 and merges at the other end into a constriction 173 which in turn merges into an outwardly enlarged nozzle portion 174 opening into the combustion chamber. In the cylindrical bore 171 is positioned a catalyst 175 of, for instance, a silver-based material, which catalyst is interposed between axially spaced seat members 176 and 177 each having apertures providing communication thereacross. A valve head 178 is axially movable in the bore 171 toward and away from the inlet port 172 for the hydrogen peroxide and is connected to a valve guide 179 which is axially slidably received in an axial bore formed in the seat member 176 positioned upstream of the catalyst 175. The valve head 178 is biased toward a position to close the inlet port 172 from the oxidizing gas supply passageway 35 by means of a preload compression spring 180 which is seated at one end on the outer face of the seat member 176 and at the other on the back face of the valve head 178. The preload compression spring 180 has a spring constant which is approximately selected so that the valve head is forced to withdraw from the initial position to a position opening the inlet port 172 when the hydrogen peroxide gas is directed into the inlet port 172 under a pressure higher than a predetermined level. The valve housing 170 is further formed with a fuel inlet port 181 which is in communication with the fuel feed passageway 34 and which is opened into the nozzle 174 so that the hot mixture of the water and oxygen resulting from the exothermic decomposition of the hydrogen peroxide in the catalyst 175 is efficiently admixed to the hydrogen gas sucked in from the fuel inlet port 181 into the nozzle 174. Intermediate between the fuel inlet port 181 and the fuel feed passageway 34 may be preferably provided a one-way check valve 182 for preventing the reverse flow of the hydrogen gas to the passageway as would be caused by the sudden increase of the pressure in the nozzle during the combustion of the hydrogen gas in the combustion chamber.

Turning to FIG. 11, there is shown a fluid injection valve which now includes a valve housing 183 which is formed with an axial bore 184 communicating at one end with a chamber 185 and at the other with a generally frusto-conical chamber 186. A plunger 187 is axially slidably received in this axial bore 184, having a flanged rear end portion extending into the chamber 185 and a stepwise reduced leading end portion which is axially movable through the frusto-conical chamber 186. This frusto-conical chamber 186 has a forwardly reduced end or an aperture 188 which is opened into a venturi 189. A catalyst 190 generally in a disc form is positioned between the aperture 188 and venturi 189. The chamber 185 formed in the opposite end portion of the valve housing 183 to the venturi 189 has accommodated therein a preload compression spring 191 which is seated at one end on an end wall of the chamber 185 and at the other on a flange 187a on the rear end portion of the plunger 187 extending into the chamber 185, so that the plunger 187 is biased forwardly for having its stepwise reduced end portion urged to close the aperture 188 intervening between the frusto-conical chamber 186 and the venturi 189. The flange 187a of the plunger 187 serves also as a stop member for limiting the forward movement of the plunger through the cylindrical bore 184. The frusto-conical chamber 186 communicates upstream with an oxidizing gas inlet port 192 leading from the source of the hydrogen peroxide. The valve housing 183 is further formed with a fuel inlet port 193 leading from the fuel or hydrogen gas feed passageway and opening into the venturi 189.

The plunger 187 which has a rest position closing the aperture 188 by the action of the preload spring 191 is moved away from the aperture 188 against the action of the preload spring when the hydrogen peroxide gas under a pressure higher than a predetermined level is admitted to the frusto-conical chamber 186. The aperture 188 is consequently opened by the stepped reduced end portion of the plunger thus retracted so that the hydrogen peroxide is passed to the catalyst 190 through the aperture 188. The hydrogen peroxide thus exothermically decomposes upon contact with the catalyst 190 and the resultant hot mixture of the water and oxygen spurts into the venturi 189. This causes a suction to be built up in the venturi 189 so that the hydrogen gas is sucked in from the fuel inlet port 193 into the venturi and is mixed therein with the hot mixture of the water vapour and oxygen. By reason of the reduced thickness of the catalyst 190, the hydrogen peroxide can be decomposed substantially instantaneously so that the hot mixture is ejected at an accurately controlled timing into the combustion chamber into which the venturi 189 is opened.

Figure 12:
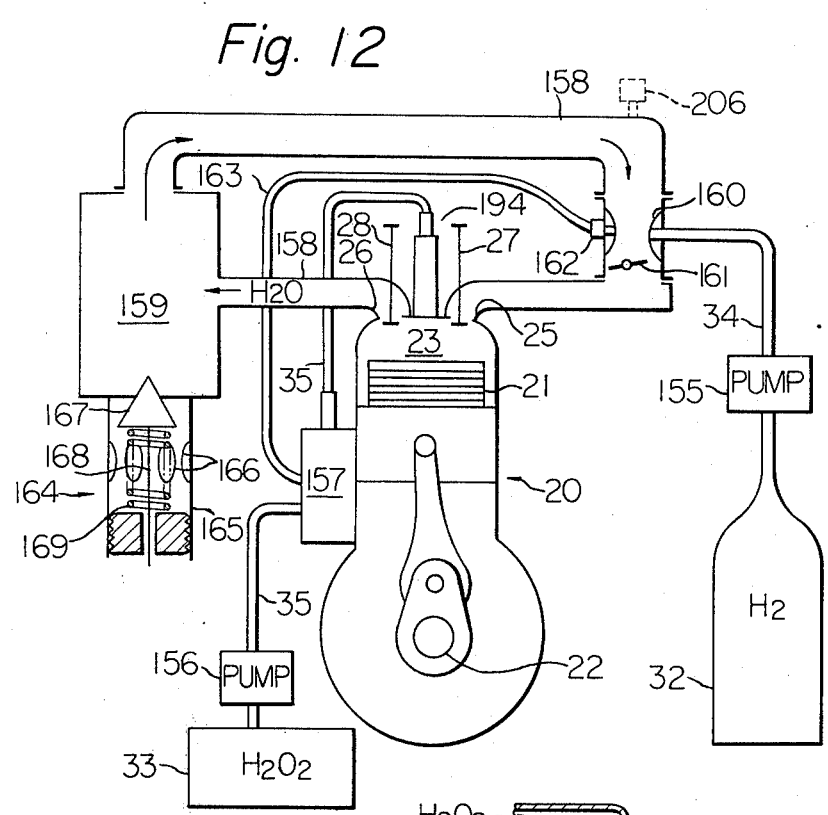
FIG. 12 is a schematic view showing a modification of the reciprocating-piston internal combustion engine illustrated in FIG. 9.

FIG. 12 illustrates a modified embodiment of the internal combustion engine shown in FIG. 9. While the internal combustion engine shown in FIG. 9 is constructed in a manner that the hydrogen gas as the fuel is injected into the hot gases resulting from the decomposition of the hydrogen peroxide, the embodiment of FIG. 12 is adapted to feed the hydrogen gas into the exhaust recirculation passageway, similarly to the embodiment shown in FIG. 5.

For this purpose, the fuel feed passageway 34 leading from the source 32 of hydrogen through the pressure regulator 155 is opened into the venturi 160 of the exhaust recirculation passageway 158 so that the hydrogen gas is admixed to the exhaust gases or the water vapour being recirculated through the venturi 160. The mixture of the water vapour and hydrogen gas is admitted into the combustion chamber 23 through the intake port 25 and the hydrogen is combusted with the energy of the hot gases injected from a fluid injection valve 194 having an inlet port which is in communication with the source 33 of hydrogen peroxide through the feed pump 156 and injection pump 157.

Figure 13:
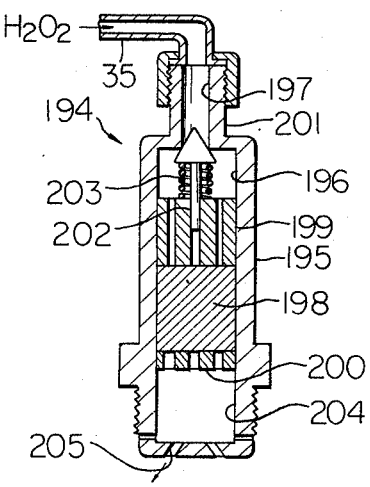
FIG. 13 is a longitudinal sectional view showing, on an enlarged scale, a preferred example of a fluid injection valve for use in the internal combustion engine illustrated in FIG. 12.

A preferred example of the fluid injection valve 194 applicable to the internal combustion engine above described is illustrated in FIG. 13. The fluid injection valve herein shown is constructed essentially similarly to the fluid injection valve shown in FIG. 10, including a valve housing 195 which is formed with a cylindrical bore 196 communicating upstream with an inlet port 197 leading from the oxidizing gas supply passageway 35. A catalyst 198 is held in position within the cylindrical bore 196 by means of axially spaced apertured seat members 199 and 200, which are fast on the valve housing 198. A valve head 201 is connected to a valve guide 202 which is axially slidable through a guide hole formed in the seat member 199 close to the inlet port 197 so that the valve head 201 is movable toward and away from the inlet port 197. A preload compression spring 203 is seated at one end on the outer face of the seat member 199 and at the other on the back face of the valve head 201 for urging the valve head 201 against a circumferential edge defining the inlet port 197. Between the seat member 200 downstream of the catalyst 198 and the end wall of the valve housing 198 opposite to the inlet port 197 is formed a chamber 204 which is opened into the combustion chamber 23 of the engine cylinder 20 (FIG. 12) through apertures 205. The flow of the hydrogen peroxide entering the inlet port 197 acts on the valve head 201 and forces the valve head to move away from the inlet port 197 so that the hydrogen peroxide is admitted to the cylindrical bore 196 in the valve housing 195. The hydrogen peroxide is thus passed to the catalyst 198 through the apertures formed in the seat member 199 positioned upstream of the catalyst 198 and exothermically decompose into the hot mixture of the water and oxygen. The hot mixture is then passed to the chamber 204 and injected therefrom into the combustion chamber through the apertures 205. To uniformly distribute the hot mixture in the combustion chamber, the apertures 205 may be preferably directed radially outwardly as shown.

The embodiments shown in FIGS. 9 and 12 may be modified so that atmospheric air is additionally admixed at a limited rate to the exhaust gases or the water vapour to be recirculated to the combustion chamber. For this purpose, the exhaust recirculation passageway 158 may be provided with an air inlet valve unit 206 which is positioned intermediate between the exhaust reservoir 159 and venturi 160 as indicated by broken lines in FIGS. 9 and 12.

As will be now apparent from the foregoing description, the internal combustion engine according to the present invention is characterized in that the fuel in the form of hydrocarbons or hydrogen gas is combusted with the agency of the hydrogen peroxide or oxygen gas which is adapted to produce heat of an elevated temperature advantageous for the elimination of the carbon monoxide and unburned hydrocarbons in the exhaust gases and which contains no element nitrogen which would otherwise become a source of nitrogen oxides in the exhaust gases. The hydrogen peroxide or oxygen gas may be supplied from time to time to the internal combustion engine used in stationary industrial equipment such as power plants, mine equipment and equipment for underground or underwater operations. In this instance, the capacity of the container or tank for storing the hydrogen peroxide or oxygen gas will become one of the major problems where the internal combustion engine of the described character is used in power driven vehicles such as automobiles. In view of the limited capacity of storing the hydrogen peroxide or oxygen gas, therefore, it is preferred to save the consumption of such an oxidizing gas to a practically allowable extent. For this purpose, the internal combustion engine according to the present invention may be so constructed that it operates with use of the hydrogen peroxide or oxygen while the engine is being driven under a condition in which emission of the toxic compounds is limited under a permissible level or raises no serious problems as in the cases where the engine is put in use in suburban or uninhabited areas. A preferred embodiment of the internal combustion engine of the particular nature is illustrated in FIG. 14. The internal combustion engine herein shown is also assumed to be of the four-cycle reciprocating-piston type having a construction which is essentially a combination of the embodiments shown in FIGS. 9 and 12 and, therefore, the parts and elements corresponding to those of the embodiments of FIGS. 9 and 12 will be designated in FIG. 14 by the same reference numerals.

Referring to FIG. 14, the shown internal combustion engine uses two substantially independent fuel supply lines which lead from a common source 32 of a liquid or gaseous fuel which may be in the form of either hydrocarbons or hydrogen gas. The fuel source 32 is in communication through a fuel delivery passageway 207 with a three-way flow shift valve 208. Two fuel feed passageways 209 and 209' lead from this flow-shift valve 208. One fuel feed passageway 209 is operative to supply the fuel to the combustion chamber 23 of the engine cylinder 20 during a condition in which the engine is to operate with use of the hydrogen peroxide or oxygen and thus terminates in a fluid injection valve 29 opening into the combustion chamber 23. The other fuel feed passageway 209' is intended to supply the fuel to the combustion chamber 23 through an exhaust recirculation passageway 158 and thus terminates into a construction or venturi 160 formed in the exhaust recirculation passageway 158. Where the liquid fuel of hydrocarbons such as gasoline is to be used, the fuel feed passageway 209' may preferably opened into the venturi 160 through a carburetor 210 and a jet nozzle 211. The exhaust recirculation passageway 158 includes, in addition to an exhaust reservoir 159 positioned downstream of the venturi 160 and a flow control valve 161 positioned intermediate between the venturi 160 and intake port 25, an exhaust discharge valve 212 positioned intermediate between the exhaust port 26 and exhaust reservoir 159, and an exhaust recirculation pump 213 which is positioned intermediate between the exhaust reservoir 159 and venturi 160. The exhaust reservoir 159 is herein shown as being equipped with a pressure relief valve 164 the construction and operation have been described with reference to FIG. 12 and will not be explained repeatedly.

The exhaust discharge valve 212 is adapted to be open the exhaust recirculation passageway 158 anterior to the exhaust reservoir 159 when the flow-shift valve 208 is in a position to deliver the fuel to the fuel feed passageway 209 and closes the exhaust recirculation passageway 158 when the flow-shift valve 208 is conditioned to deliver the fuel to the fuel feed passageway 209'. Thus, an exhaust discharge passageway 214 is branched through the exhaust discharge valve 212 from the exhaust recirculation passageway 158 and is opened to the outside of the engine. The exhaust recirculation pump 213, on the other hand, is driven from the crankshaft 22 of the engine cylinder 20 through drive and driven pulleys 215 and 216, respectively, and an endless belting 217 as shown. An air inlet passageway 218 is opened at one end to the atmosphere and at the other into the exhaust recirculation passageway 158 intermediate between the exhaust recirculation pump 213 and venturi 160. At a junction between the exhaust recirculation passageway 158 and this air inlet passageway 218 is disposed a two-position selector valve 219 which can be shifted between two different positions as indicated by full and broken lines in FIG. 14. In one position of the selector valve 219 as indicated by full lines, the valve 218 blocks the communication between the air inlet passageway 218 and exhaust recirculation passageway 158 so that the exhaust gases pumped from the exhaust reservoir 159 by the pump 216 are totally passed over to the combustion chamber 23 through the venturi 160 and flow control valve 161. When the selector valve 219 is in the other position indicated by the broken lines, then the communication across the selector valve 219 is blocked and instead the air inlet passageway 218 is allowed to communicate with the combustion chamber through the venturi 160 and flow control valve 161 whereby the exhaust gases are prevented from entering the venturi 160 and the fresh air is introduced into the venturi 160. The former position of the selector valve 219 is selected when the flow-shift valve 208 is in a position to deliver the fuel to the fuel feed passageway 209 and the latter position of the valve 219 selected when the flow-shift valve 208 shifts the delivery of the fuel to the other fuel feed passageway 209'.

The fluid injection valve 29 may be constructed in any desired manner preferably similarly to the example shown in FIG. 4, 7 or 10 and may include a catalyst 29a of a silver-based material for example where the hydrogen peroxide gas is used as the oxidizing gas for the fuel. The hydrogen peroxide or oxygen gas is supplied from a source 33 through an oxidizing gas supply passageway 35 incorporating an injection pump 157 which is driven from the crankshaft 22 of the engine cylinder 20 through drive and driven pulleys 215 and 220, respectively, and an endless belting 221 passed on the pulleys as shown. The injection pump 157 is connected through a line 222 to a suction sensor 223 which is adapted to detect a suction built up in the venturi 160 for controlling the delivery and rate of delivery of the injection pump 157.

The flow-shift valve 208, exhaust discharge valve 212, selector valve 219 and suction sensor 223 cooperate with each other under the control of a suitable control arrangement which is responsive to varying driving conditions of the engine or of a motor vehicle where the engine is installed on the motor vehicle. Where the internal combustion engine for the construction above described is to be mounted on the motor vehicle, the valves 208, 212 and 219 and suction sensor 223 may be controlled in accordance with driving speed of the motor vehicle in view of the fact that motor vehicles are decelerated or driven at relatively low speeds far more frequently during cruising in city-road driving than during cruising on suburban highways or in uninhabited areas and that the air pollution problem is more serious in urban areas than in suburban or uninhibited areas. For this purpose, the control arrangement for the valves 208, 212 and 219 and suction sensor 223 may be of the character which controls the valves and sensor in a manner to supply the fuel and hydrogen peroxide to the combustion chamber 23 through the fluid injection valve 29 during a condition in which the motor vehicle is being driven at a speed lower than a predetermined limit of, for example, 40 km/hour and to supply the mixture of fuel and air to the combustion chamber 23 during a condition in which the motor vehicle is driven at a speed higher than such a predetermined limit. A preferred example of the control arrangement is schematically illustrated in FIG. 15.

Referring to FIG. 15, the control arrangement for the three-way flow shift valve 208, exhaust discharge valve 212, two-position selector valve 219 and suction sensor 223 includes a central control unit 224 which is adapted to produce an electrical signal in response to a vehicle speed higher than a predetermined level which may, for example, 40 km/hour, as above mentioned. The central control unit 224 may comprise, though not shown, vehicle speed sensing means, voltage generating means responsive to the speed sensing means for producing a voltage proportional to the vehicle speed detected by the sensing means, and comparator means receiving the output voltage from the voltage generating means for comparing the voltage with a predetermined reference voltage which is representative of the predetermined vehicle speed so that the compartor means produces an electrical control signal when the output voltage from the voltage generating means is higher than the predetermined reference voltage. The circuit arrangement adapted to achieve these functions may be readily devised by those skilled in the art through utilization of, for example, a tachometric generator and, therefore, no further detailed description of the construction of the control unit 224 will be herein incorporated.

Where the control unit 224 is constructed in a manner above described, the three-way flow-shift valve 208 should be biased to deliver the fuel to the fuel feed passageway 209 leading to the fluid injection valve, the exhaust discharge valve 212 biased to open the exhaust recirculation passageway 158 leading to the exhaust reservoir 159, the two-position selector valve 219 biased to provide communication between the exhaust recirculation pump 213 and venturi 160 and the suction sensor 223 biased to direct the suction in the venturi 160 to the oxidizing gas injection pump 157 through the passageway 222. In other words, the valves 209, 212 and 219 and suction sensor 223 are all adapted to operate the engine with the agency of the hydrogen peroxide or oxygen in the presence of the output voltage from the central control unit 224. For moving the valves 208, 212 and 219 against the respective biasing efforts thus applied thereto, they are provided with suitable drive means which are connected to the control unit 224 through electrical lines which are not numbered. The suction sensor 223, on the other hand, is adapted to terminate the delivery of the hydrogen peroxide or oxygen gas from the oxidizing gas injection pump 157 in the absence of the output voltage from the control unit 224. For this purpose, the suction sensor 224 may include a housing 225 formed with a chamber 226 which is opened at one end into the venturi 160 and which communicates at the other end with the oxidizing gas injection pump 157 through the passageway 222 (FIG. 14). The housing 225 carries thereon a solenoid operated control valve 227 having a chamber which communicates on one side with the chamber 226 through an aperture 228 formed in a wall portion of the housing 225 and which is vented on the other side to the open air through an aperture 229. A valve member 230 having an opening providing communication thereacross is movable through the aperture 228 and is biased by a preload compression spring 231 toward a position to close the aperture 228. The valve member 230 is moved away from this position against the action of the preload compression spring 231 under the influence of a magnetic field built up by a solenoid coil 232 surrounding the valve member 230 or, though not shown, a core connected to the valve member 230. The solenoid coil 232 is connected to the output of the central control unit 224 through electrical lines.

Reference will now be made concurrently to FIGS. 14 and 15 to described the operation of the internal combustion engine therein shown.

When, now, the motor vehicle incorporating the internal combustion engine above described is being driven at a speed lower than the predetermined level of, say, 40 km/hour as during city-road driving, then the control unit 224 produces no output voltage so that the valves 208, 212 and 219 are all held in the biased positions. Thus, the three-way flow shift valve 208 delivers the fuel from the fuel source 32 to the fluid injection valve 29 through the fuel feed passageway 209 while the oxidizing gas injection pump 157 delivers the hydrogen peroxide or oxygen gas to the fluid injection valve 29 through the oxidizing gas supply passageway 35 since the suction sensor 223 is maintained in such a condition that the solenoid coil 232 remains de-energized in the absence of the output voltage from the control unit 224 whereby the valve member 230 is biased by the preload spring 231 to close the aperture 228 for allowing the suction in the venturi 160 into the oxidizing gas injection pump 157. The fuel and hydrogen peroxide or oxygen gas entering the fluid injection valve 29 are mixed with each other and the hot mixture thus produced in the fluid injection valve 29 is admitted into the combustion chamber 23 of the engine cylinder 20. Under this condition, the exhaust discharge valve 212 is held in the position indicated by the full lines for opening the exhaust recirculation passageway 158 leading to the exhaust reservoir 159 and closing an inlet to the exhaust discharge passageway 214 while the two-position selector valve 219 is held in a position indicated by the full lines for providing unrestricted communication between the exhaust recirculation pump 213 and venturi 160. As a consequence, the exhaust gases emitted from the combustion chamber 23 into the exhaust port 26 are totally passed to the exhaust reservoir 159 and the exhaust gases in the reservoir 159 are pumped by the exhaust recirculation pump 213 to the combustion chamber 23 through the venturi 160 and flow control valve 161 which is driven from the outside of the engine for controlling the flow rate of the exhaust gases recirculated into the combustion chamber 23. The exhaust gases are thus admitted into the combustion chamber 23 during the intake strokes and are mixed with the mixed with the combustion gases in the chamber 23. During the condition in which the engine operates on the above described principle, the fuel feed passageway 209' and the air inlet passageway 218 are maintained inoperative so that no fuel is directed into the venturi 160 and no fresh air is drawn into the exhaust recirculation passageway 158. The exhaust gases emitted from the combustion chamber 23 thus contain no toxic compounds and, moreover, prevented from being discharged to the open air through the exhaust discharge passageway 212. In case, however, the pressure in the exhaust reservoir 159 rises beyond a predetermined level, the pressure relief valve 164 opens so that an excess of exhaust gases in the reservoir 159 is discharged to the atmosphere until the predetermined level of the pressure is restored in the reservoir.

When, on the other hand, the motor vehicle equipped with the internal combustion engine shown in FIG. 14 is being driven at a speed higher than the predetermined level as in the case of cruising on the suburban highways or in the uninhabited areas as previously mentioned, the central control unit 224 now produces the control signal so that the three-way flow-shift valve 208 shifts the flow of the fuel to the fuel feed passageway 209' terminating in the venturi 160 of the exhaust recirculation passageway 158. While this occurs, the solenoid coil 232 of the solenoid operated valve 227 of the suction sensor 223 becomes energized from the control unit 224 for moving the valve member 230 against the action of the preload compression spring 231 to a position opening the aperture 228 so that the chamber 226 in the housing 225 is vented to the open air through the aperture 228, opening in the valve member 230 and aperture 229. The suction drawn from the venturi 160 is thus allowed out of the chamber 226 whereby the oxidizing gas injection pump 157 controlled by the suction ceases delivery of the hydrogen peroxide or oxygen gas to the passageway 35. Under this condition, the exhaust discharge valve 212 is moved to a position indicated by broken lines in FIGS. 14 and 15 for interrupting the flow of the exhaust gases to the exhaust reservoir 159 and allowing the exhaust gases to the open air through the exhaust discharge passageway 214 which is now in communication with the exhaust port 26 of the combustion chamber 23. At the same time, the two-position selector valve 218 is driven in response to the control signal from the control unit 224 to a position indicated by broken lines in FIGS. 14 and 15 for blocking the communication between the exhaust recirculation pump 213 and venturi 160 and providing communication between the air inlet passageway 218 and the venturi 160. The atmospheric this causes the atmospheric air to be drawn into the venturi 160 through the air inlet passage 218 and to mix with the fuel ejected into the venturi 160 from the jet nozzle 211. The resultant mixture of air and fuel is then admitted to the combustion chamber 23 at a rate controlled by the flow control valve 162 during the intake strokes of the piston 21. The exhaust gases thus produced as a result of the combustion of the mixture of fuel and air in the combustion chamber 23 will contain the toxic compounds such as the unburned hydrocarbons, carbon monoxide and nitrogen oxides in considerable proportions but the emission of such toxic compounds is herein regarded as permissible because the proportions of such compounds are relatively low by reason of the relatively high driving speed of the engine and because the motor vehicle incorporating the engine is assumed to be cruising in those areas which are scarcely inhibited or substantially uninhibited.

Though not mentioned in the foregoing, the exhaust recirculation pump 213 driven from the crankshaft 22 of the engine cylinder may be shut down in a suitable manner in response to the control signal supplied from the central control unit 224.

The valves 208, 212 and 219 have been described as being electrically controlled from the control unit 224 but, where desired, they may be controlled in other suitable manners such as by the aid of mechanical linkages or in a pneumatic or hydraulic fashion with or without use of solenoid devices.

The exhaust discharge valve and passageway 212 and 214, respectively, may be removed from the construction shown in FIG. 14 where the exhaust reservoir 159 is provided with the pressure relief valve unit 164 of the described construction. It is, in this instance, of importance that the working area of the valve head 167 and/or the spring constant of the preload compression spring 169 may be selected in a manner that the valve head 167 is moved against the preload compression spring 169 in response to a pressure higher than a relatively low level.

The central control unit 224 has thus far been assumed as being responsive to the driving speed of the motor vehicle where the internal combustion engine of the described character is to be mounted thereon. This, however, is merely by way of example and, accordingly, the valves 208, 212 and 219 and suction sensor 223 may be controlled in accordance with various other operational variables of the engine or the motor vehicle such as for example the modes of operation of the engine including the idling, acceleration, normal cruising and deceleration which maybe represented by the revolution speed of the engine, the suction in the exhaust recirculation passageway immediately upstream of the intake port of the combustion chamber, the angular position of the flow control valve in the recirculation passageway, the temperature of the gases entering the intake port or of a cooling medium for the engine cylinder or any combination of these.

A modified embodiment of the internal combustion engine shown in FIG. 14 is illustrated in FIG. 16. This modified embodiment is adapted to recirculate the exhaust gases substantially totally to the combustion chamber 23 during the condition in which the engine is operate with use of the hydrogen peroxide or oxygen gas and to partly recirculate the exhaust gases to the combustion chamber while discharging a major portion of the exhaust gases to the open air during the condition in which the engine operates on the mixture of fuel and air. Thus, the exhaust discharge valve 212 and the associated passageway 214 used in the internal combustion engine shown in FIG. 14 are removed from the embodiment herein shown while the two-position selector valve, now designated by reference numeral 219', is so arranged as to totally isolate the air inlet passageway 218 from the exhaust recirculation passageway 158 when the engine is to operate on the mixture of fuel and hydrogen peroxide or oxygen and to provide restricted communication between the exhaust reservoir 159 and venturi 160 when the valve 219 is shifted to the position allowing the atmospheric air to enter the venturi 161. In this instance, the pressure relief valve unit 164 should be constructed so that the exhaust gases are discharged to the open air from the exhaust reservoir 159 when the pressure of the exhaust gases in the reservoir is higher than a relatively low level, as previously discussed. The internal combustion engine of the construction above described is useful for reducing the quantity of carbon monoxide and unburned hydrocarbons in the exhaust emission when the engine operates on the mixture of fuel and air because the exhaust gases recirculated into the combustion chamber under such a condition are re-circulated in the combustion chamber so that the combustible mixture contained in the recirculated exhaust gases is burned.

Having thus described the various embodiments of the internal combustion engine according to the present invention, it will now be appreciated that the internal combustion engine herein proposed have the advantages which are summarized as follows:

1. Since the exhaust gases contain only the water vapour or the mixture of the water vapour and carbon dioxide where the fuel is combusted entirely with the agency of the hydrogen peroxide or oxygen gas or even where atmospheric air is mixed with the fuel or the hydrogen peroxide or oxygen, the exhaust gases from the engine are completely clear of the unburned hydrocarbons, carbon monoxide and nitrogen oxides which would otherwise cause serious air pollution problems.

2. The internal combustion engine is operable on any type of fuels including the solid, liquid and gaseous fuels which may be in the form of hydrocarbons and hydrogen gas. Where the solid fuel such as the waste plastics is utilized as the fuel, not only the air pollution can be eliminated by the contamination resulting from the garbage of the waste plastic materials will be reduced efficiently and economically without resort to the use of specially constructed costly plastics destroying plants. Where, on the other hand, the hydrogen is utilized as the fuel, the cost for fuel consumption will be significantly reduced because of the fact that the hydrogen gas is available practically inexhaustibly.

3. Since the combustion of the fuel is caused in the absence of air, not only the nitrogen oxides are contained in the exhaust gases but the engine can be placed on use where air is extremely lean or completely absent. If, thus, the engine is constructed in such a manner as to be totally closed (wherein the exhaust discharge port, if any, should be provided with suitable one-way check means as is the case with some of the embodiments previously described), then the internal combustion engine will be operable as the driving source for underwater operations where air is extremely thin or rarefied.

4. By reason of the simplicity of the combustion principle and accordingly of the construction, the internal combustion engine may be of any of the types presently in use, including two-cycle and four-cycle engines, single cylinder and multi-cylinder engines, jump-spark ignition and compression ignition engines, and re-sprocating-piston and rotary-piston engines. Thus, the internal combustion engine according to the present invention will find a wide variety of applications in, for example, general power-driven land vehicles, boats and ships, railway cars, trolleys, marine equipments, space aircraft, power plants, mine equipment, and equipment for underground constructions and operations.

5. Since the fuel is fired without use of spark plugs especially where the hydrogen peroxide is used as the oxidizing gas for the fuel, expenses otherwise required for the provision of the costly spark plugs and the associated electrical and other devices can be dispensed with the resultant reduction in the production cost of the engine as a whole.

6. The safety of storage and handling of the hydrogen peroxide can be assured provided pertinent protective means are used and sufficient care is exercised in handling the same.

The internal combustion engine according to the present invention is thus expected to contribute to resolution of the air-pollution problems resulting from the emission of the exhaust gases from motor vehicles and various industrial plants.

What is claimed is:

1. In an internal combustion engine of the type including a combustion chamber having intake and exhaust ports; and injection means for injecting a mixture of fuel and oxidizer into said combustion chamber, the improvement comprising:

means defining an exhaust flowpath for providing communication between said exhaust port and said intake port;

wherein said injection means comprises means defining a fuel flowpath, including a venturi, for delivering fuel to said combustion chamber and means defining an oxidizer flowpath for delivering oxidizer to said fuel flowpath downstream of said venturi; and wherein said means defining an exhaust flowpath comprises a branched conduit providing communication between said exhaust port and said intake port, and providing communication between said exhaust port and the ambient atmosphere, a throttle valve disposed in the portion of said branched conduit in communication with said intake port and actuatable for controlling the flow of exhaust gases to said intake port, a sensor disposed in the portion of said branched conduit in communication with said intake port at a position downstream from said throttle valve for developing an output signal representative of the flow rate of exhaust gases at said position, a fuel pump responsive to the sensor output signals for providing fuel under pressure to said means defining a fuel flowpath and for increasing the fuel pressure in response to sensed increases in exhaust gas flow rate, means for applying the sensor output signal to said fuel pump, valve means responsive to the sensor output signal for decreasing the rate of exhaust gas flow into the ambient atmosphere in response to sensed increases in exhaust gas flow rate, and means for applying the sensor output signal to said valve means.

2. In an internal combustion engine according to claim 1, wherein said means defining an exhaust flowpath further comprises an engine driven pump for pumping exhaust gases through said conduit.

3. In an internal combustion engine according to claim 1, wherein said injection means comprises:

a valve body having therein said means defining a fuel flowpath and said means defining an oxidizer flowpath; and means normally closing the fuel and oxidizer flowpaths and responsive to fuel applied under pressure to open said fuel and oxidizer flowpaths to effect fuel-oxidizer flow at a rate determined by the fuel pressure and at a substantially constant ratio of fuel to oxidizer.

4. In an internal combustion engine according to claim 3, wherein:

said means defining a fuel flowpath defines a bore extending through said valve body and having an inner circumferential groove and a venturi downstream from said groove;

said means defining an oxidizer flowpath defines an annular chamber within said valve body and concentric with said bore extending therethrough, a passageway extending circumferentially from said annular chamber and communicating with said bore downstream from said venturi, and a second passageway providing communication between said annular chamber and the exterior of said valve body; and said means normally closing the fuel and oxidizer flowpaths comprises a piston disposed in said bore upstream from said venturi and slidable from a position upstream from said groove to close said bore to a position in registry with said groove to open said bore, a rod fixed to and extending from said piston in a downstream direction axially of said bore and through the venturi, a valve head complementary to the portion of the bore downstream from the venturi and fixed to said rod to close said bore and said passageway in communication with said bore and said annular chamber when said piston is positioned to close said bore, and a spring biasing said piston to close said bore;

whereby fuel delivered under pressure to said fuel flowpath bears on said piston to position it to open said bore thereby positioning said valve head to open said passageway in communication with said bore and said annular chamber and place said oxidizer flowpath in communication with said fuel flowpath.

5. In an internal combustion engine according to claim 1, further comprising means for supplying an oxidizer under pressure to said means defining an oxidizer flowpath; and means for supplying fuel under pressure to said means defining a fuel flowpath.

* * * * *